US011888240B2

(12) United States Patent
Takaki et al.

(10) Patent No.: US 11,888,240 B2
(45) Date of Patent: Jan. 30, 2024

(54) PLANAR ANTENNA, PLANAR ARRAY ANTENNA, MULTI-AXIS ARRAY ANTENNA, AND WIRELESS COMMUNICATION MODULE

(71) Applicant: Murata Manufacturing Co., Ltd., Nagaokakyo (JP)

(72) Inventors: Yasunori Takaki, Tokyo (JP); Kenji Hayashi, Tokyo (JP); Masato Enoki, Tokyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 306 days.

(21) Appl. No.: 17/386,894

(22) Filed: Jul. 28, 2021

(65) Prior Publication Data

US 2021/0359415 A1 Nov. 18, 2021

Related U.S. Application Data

(63) Continuation of application No. PCT/JP2020/003194, filed on Jan. 29, 2020.

(30) Foreign Application Priority Data

Jan. 31, 2019 (JP) ................................ 2019-015994

(51) Int. Cl.
*H01Q 1/48* (2006.01)
*H01Q 9/04* (2006.01)
*H01Q 21/08* (2006.01)

(52) U.S. Cl.
CPC ............ *H01Q 9/0407* (2013.01); *H01Q 1/48* (2013.01); *H01Q 21/08* (2013.01)

(58) Field of Classification Search
CPC ......... H01Q 21/08; H01Q 1/48; H01Q 9/0407
See application file for complete search history.

(56) References Cited

U.S. PATENT DOCUMENTS

2002/0021255 A1 2/2002 Zhang et al.
2015/0236425 A1 8/2015 Sudo et al.

FOREIGN PATENT DOCUMENTS

JP H0270104 A 3/1990
JP 2002033619 A 1/2002
JP 2016146564 A 8/2016
WO 2014073355 A1 5/2014

OTHER PUBLICATIONS

International Search Report issued in Application No. PCT/JP2020/003194, dated Apr. 14, 2020.
Written Opinion issued in Application No. PCT/JP2020/003194, dated Apr. 14, 2020.

*Primary Examiner* — Graham P Smith
(74) *Attorney, Agent, or Firm* — Pearne & Gordon LLP

(57) ABSTRACT

A planar antenna includes a planar radiation conductor 11, a common ground conductor 32, a first strip conductor 21 located between the planar radiation conductor 11 and the common ground conductor 32 and extending in a direction in parallel to a first axis in a first right rectangular coordinate system including first, second, and third axes, a second strip conductor 22 located between the planar radiation conductor and the common ground conductor and extending in a direction orthogonal to a direction of extension of the first strip conductor, and at least one pair of passive conductors 12 to 15 each including a side at an angle of 45±3° or −45±3° with respect to the first axis and opposed to the planar radiation conductor.

20 Claims, 13 Drawing Sheets

PLANAR ANTENNA, PLANAR ARRAY ANTENNA, MULTI-AXIS ARRAY ANTENNA, AND WIRELESS COMMUNICATION MODULE

CROSS REFERENCE TO RELATED APPLICATION

This is a continuation of International Application No. PCT/JP2020/003194 filed on Jan. 29, 2020 which claims priority from Japanese Patent Application No. 2019-015994 filed on Jan. 31, 2019. The contents of these applications are incorporated herein by reference in their entireties.

FIELD OF THE DISCLOSURE

The present application relates to a planar antenna, a planar array antenna, a multi-axis array antenna, a wireless communication module, and a wireless communication device.

DESCRIPTION OF THE RELATED ART

With increase in traffic in the Internet communication and development of a technology of high-quality video images, a communication rate required in wireless communication has also increased and a technology of high-frequency wireless communication that allows transmission and reception of a large amount of information has been demanded. As a frequency of carrier waves is higher, linearity of electromagnetic waves is enhanced, and hence a radius of a cell where a base station that transmits and receives radio waves to and from a wireless terminal can communicate is smaller. Therefore, in wireless communication using carrier waves having short wavelengths, base stations are generally arranged at higher density than in a conventional example.

Consequently, the number of base stations at a short distance from a wireless communication terminal increases, and selection of a specific base station capable of high-quality communication from among a plurality of proximate base stations may be required. In other words, an antenna that is wide in its range of radiation and high in directivity may be required.

For example, PTL 1 discloses a diversity antenna for reception from a direction in which intensity of radio waves is high.

PTL 1: Japanese Patent Laying-Open No. 2016-146564

BRIEF SUMMARY OF THE DISCLOSURE

The present application provides a planar antenna, a planar array antenna, a multi-axis array antenna, a wireless communication module, and a wireless communication device capable of transmission and reception of electromagnetic waves having high directivity in a band of short wavelengths.

A planar antenna according to one embodiment of the present disclosure includes a planar radiation conductor, a common ground conductor, a first strip conductor located between the planar radiation conductor and the common ground conductor and extending in a direction in parallel to a first axis in a first right rectangular coordinate system including first, second, and third axes, a second strip conductor located between the planar radiation conductor and the common ground conductor and extending in a direction orthogonal to a direction of extension of the first strip conductor, and at least one pair of passive conductors each including a side at an angle of 45±3° or −45±3° with respect to the first axis and opposed to the planar radiation conductor.

The planar antenna may include the one pair of passive conductors each including the side at the angle of 45±3° with respect to the first axis and opposed to the planar radiation conductor and another pair of passive conductors each including the side at the angle of −45±3° with respect to the first axis and opposed to the planar radiation conductor.

The planar radiation conductor and the passive conductors may be flush with each other.

The planar antenna may further include an antenna ground conductor located between the first and second strip conductors and the common ground conductor, and the antenna ground conductor may be superimposed at least on the entire planar radiation conductor when viewed in a direction of the third axis.

The planar antenna may further include at least one first via conductor that connects the passive conductor and the antenna ground conductor to each other.

The planar antenna may further include a dielectric including a main surface perpendicular to the direction of the third axis, and the planar radiation conductor, the common ground conductor, the first strip conductor, the second strip conductor, and the passive conductors may be located in the dielectric.

A planar array antenna according to one embodiment of the present disclosure includes a plurality of the above-described planar antennas aligned in a direction of the first axis, dielectrics of the planar antennas are integrally formed, common ground conductors of the planar antennas are connected to each other, and antenna ground conductors of the planar antennas are separate from each other.

The planar array antenna may include a plurality of second via conductors extending along the third axis and aligned in parallel to the second axis in at least one pair of adjacent planar antennas of the plurality of planar antennas, and the plurality of second via conductors may be connected to the common ground conductors.

The plurality of second via conductors may include a first row further connected to the antenna ground conductor of one of the pair of adjacent planar antennas and a second row further connected to the antenna ground conductor of the other of the pair of adjacent planar antennas.

The plurality of second via conductors may have a height equal to or more than a distance between the common ground conductor and the planar radiation conductor in a direction in parallel to the third axis.

A planar antenna according to another embodiment of the present disclosure includes a planar radiation conductor, a common ground conductor, a first strip conductor located between the planar radiation conductor and the common ground conductor and extending in a direction at an angle of 45±3° with respect to a first axis in a first right rectangular coordinate system including first, second, and third axes, a second strip conductor located between the planar radiation conductor and the common ground conductor and extending in a direction orthogonal to a direction of extension of the first strip conductor, and an antenna ground conductor including in an outer periphery, at least one pair of sides located between the first and second strip conductors and the common ground conductor and being at an angle of 45±3° or −45±3° with respect to the first axis.

The antenna ground conductor may include, when viewed in a direction of the third axis, the one pair of sides at the angle of 45±3° with respect to the first axis, between which the planar radiation conductor lies, and another pair of sides at the angle of −45±3° with respect to the first axis, between which the planar radiation conductor lies.

The planar antenna may further include at least one third via conductor located along the outer periphery of the antenna ground conductor and connecting the antenna ground conductor and the common ground conductor to each other.

The planar antenna may further include a dielectric including a main surface perpendicular to a direction of the third axis, and the planar radiation conductor, the common ground conductor, the first strip conductor, the second strip conductor, and the passive conductor may be located in the dielectric.

A planar array antenna according to one embodiment of the present disclosure includes a plurality of the above-described planar antennas aligned in a direction of the first axis, dielectrics of the planar antennas are integrally formed, common ground conductors of the planar antennas are connected to each other, and antenna ground conductors of the planar antennas are connected to each other.

The planar array antenna may include a plurality of second via conductors extending along the third axis and aligned in parallel to the second axis in at least one pair of adjacent planar antennas of the plurality of planar antennas, and the plurality of second via conductors may be connected to the common ground conductors.

A multi-axis array antenna according to one embodiment of the present disclosure includes the planar array antenna described in any paragraph above and a plurality of linear antennas, and each of the linear antennas includes one linear radiation conductor or two linear radiation conductors, the linear radiation conductor being located at a distance from one of the plurality of planar antennas in a direction of the second axis and extending in parallel to the first axis.

The dielectric may include a side surface adjacent to a main surface and perpendicular to the second axis, and the one linear radiation conductor or the two linear radiation conductors of the linear antenna may be arranged in the dielectric in proximity to the side surface.

A wireless communication module according to one embodiment of the present disclosure includes the above-described multi-axis array antenna and at least one selected from the group consisting of an active component and a passive component.

According to the present disclosure, a planar antenna, a planar array antenna, a multi-axis array antenna, a wireless communication module, and a wireless communication device capable of transmission and reception of electromagnetic waves having high directivity can be provided.

DETAILED DESCRIPTION OF THE DISCLOSURE

Figure 1:
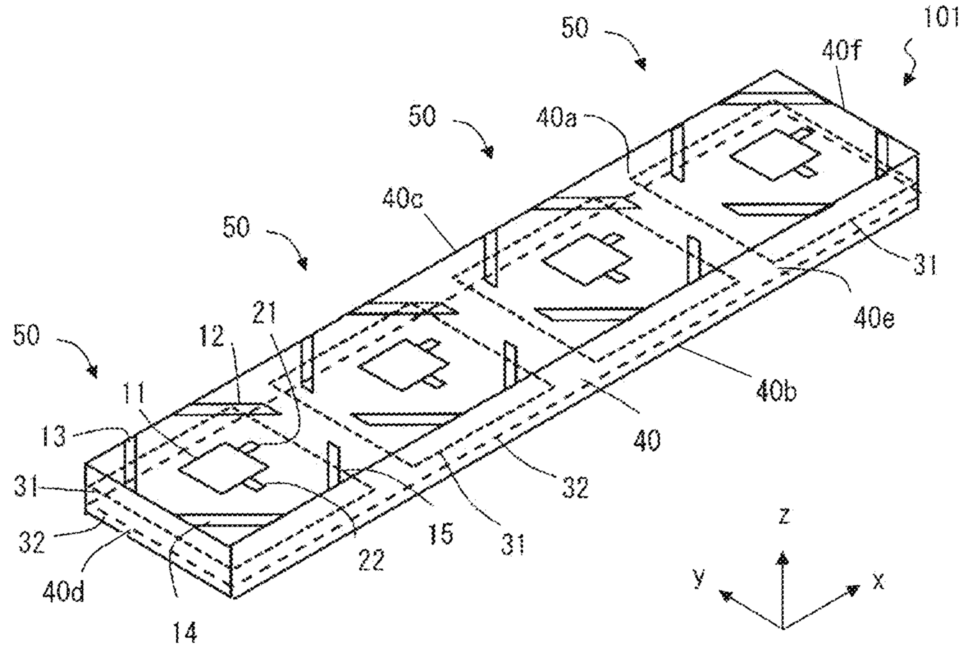
FIG. 1 is a perspective view showing a first embodiment of a planar antenna and a planar array antenna.

A planar antenna, a planar array antenna, a multi-axis antenna, a wireless communication module, and a wireless communication device in the present disclosure can be used, for example, for wireless communication in a band of quasi-microwaves, centimeter waves, submillimeter waves, and millimeter waves. In wireless communication in the quasi-microwave band, radio waves having wavelengths from 10 cm to 30 cm and frequencies from 1 GHz to 3 GHz are used as carrier waves. In wireless communication in the centimeter wave band, radio waves having wavelengths from 1 cm to 10 cm and frequencies from 3 GHz to 30 GHz are used as carrier waves. In wireless communication in the millimeter wave band, radio waves having wavelengths from 1 mm to 10 mm and frequencies from 30 GHz to 300 GHz are used as carrier waves. In wireless communication in the submillimeter wave band, radio waves having wavelengths from 10 mm to 30 mm and frequencies from 10 GHz to 30 GHz are used as carrier waves. In wireless communication in these bands, the planar antenna has a size from several centimeters to the order of submillimeters. For example, in configuring a wireless communication circuit for quasi-microwaves, centimeter waves, submillimeter waves, and millimeter waves by using a multi-layer ceramic sintered substrate, the planar antenna, the planar array antenna, or the multi-axis antenna in the present disclosure can be mounted on the multi-layer ceramic sintered substrate. In the present embodiment, a planar antenna or a planar array antenna will be described with reference to an example in which carrier waves have a frequency of 30 GHz and a wavelength λ of 10 mm by way of example of carrier waves of quasi-microwaves, centimeter waves, submillimeter waves, and millimeter waves, unless otherwise specified.

In the present disclosure, a right rectangular coordinate system is used for describing arrangement or a direction of a constituent element. Specifically, a first right rectangular coordinate system includes x, y, and z axes orthogonal to one another and a second right rectangular coordinate system includes u, v, and w axes orthogonal to one another. In order to distinguish between the first right rectangular coordinate system and the second right rectangular coordinate system and to specify the order of the axes of the right coordinate, alphabets x, y, and z and u, v, and w are given to the axes, however, these axes may be called first, second, and third axes.

Two directions being matched as referred to in the present disclosure means that an angle formed between the two directions is substantially within a range from 0° to approximately 20°. Being in parallel means that an angle formed between two planes, two straight lines, or between a plane and a straight line is within a range from 0° to approximately 10°. When a + direction or a − direction of an axis with respect to the reference matters in describing the direction with reference to the axis, description will be given with + and − of the axis being distinguished from each other. When the fact that a direction is along any of the axes matters but whether the direction is the + direction or the − direction of the axis does not matter, description will be given simply by referring to an "axis direction."

First Embodiment

A first embodiment of a planar antenna and a planar array antenna in the present disclosure will be described. FIG. 1 is a schematic perspective view showing a planar array antenna 101 in the present disclosure. FIG. 1 perspectively shows an internal configuration. Planar array antenna 101 includes a plurality of planar antennas 50. Planar antenna 50 is also called a patch antenna. Though planar array antenna 101 includes four planar antennas 50 in the present embodiment, the number of planar antennas 50 is not limited to four, and planar array antenna 101 should only include at least two planar antennas 50. In the first right rectangular coordinate system, a plurality of planar antennas 50 are aligned in an x-axis direction.

Figure 2:
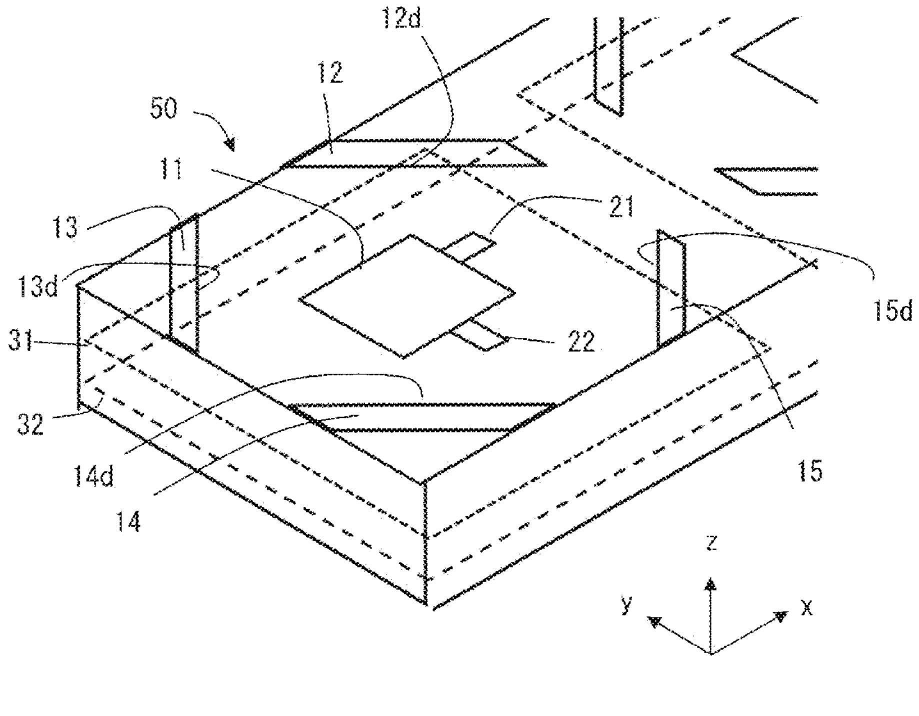
FIG. 2 is a perspective view showing as being enlarged, the planar antenna shown in FIG. 1.
Figure 3A:
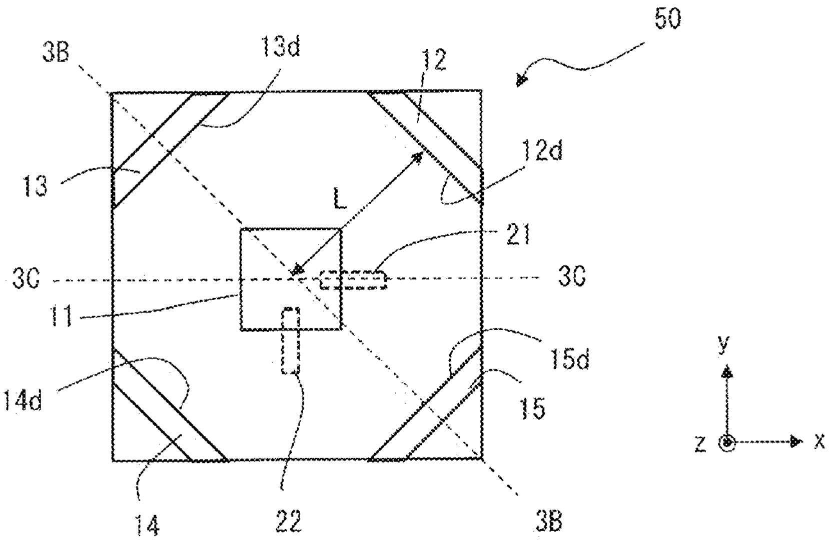
FIG. 3A is a plan view of the planar antenna shown in FIG. 1.
Figure 3B:
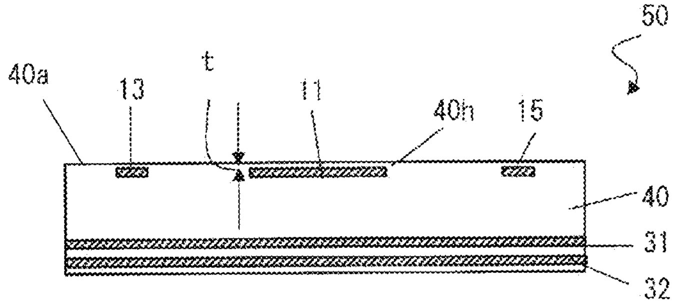
FIG. 3B is a cross-sectional view of the planar antenna along the line 3B-3B in FIG. 3A.
Figure 3C:
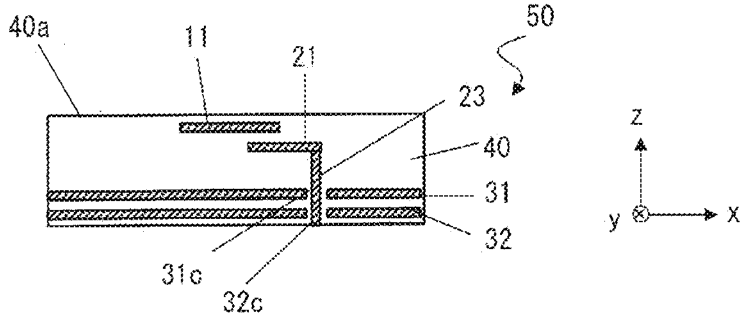
FIG. 3C is a cross-sectional view of the planar antenna along the line 3C-3C in FIG. 3A.

FIG. 2 is a schematic perspective enlarged view of one planar antenna 50 of planar array antenna 101. FIG. 3A is a schematic plan view of planar antenna 50, and FIGS. 3B and 3C are cross-sectional views along the lines 3B-3B and 3C-3C in FIG. 3A.

Each planar antenna 50 includes a planar radiation conductor 11, a first strip conductor 21, a second strip conductor 22, passive conductors 12, 13, 14, and 15, an antenna ground conductor 31, and a common ground conductor 32.

Planar radiation conductor 11 is arranged substantially in parallel to an xy plane. Planar radiation conductor 11 is a radiation element that radiates radio waves, and it is in a shape for obtaining the required radiation characteristics and impedance matching. In the present embodiment, planar radiation conductor 11 is in a substantially square shape including two sets of sides in parallel to the x-axis direction and a y-axis direction. Planar radiation conductor 11 may be in another shape such as a quadrangular shape or an annular shape. Planar radiation conductor 11 generally has a standard size with a length half of a wavelength λ of carrier waves. For example, when a dielectric 40 has a relative permittivity of 8 and when a 28-GHz band is assumed, planar radiation conductor 11 has a size, for example, of 0.5 to 2.5 mm×0.5 to 2.5 mm. Planar radiation conductor 11 is in a square shape, or in a quadrangular shape having a length in a direction in parallel at least to first strip conductor 21 set to a length triggering resonance at f0.

First strip conductor 21 and second strip conductor 22 are electromagnetically coupled to planar radiation conductor 11 and supply signal power. First strip conductor 21 extends in the x-axis direction, and second strip conductor 22 extends in a direction orthogonal to a direction of extension of the first strip conductor, that is, in the y-axis direction.

Antenna ground conductor 31 is located between planar radiation conductor 11 and common ground conductor 32. A part of first strip conductor 21 and a part of second strip conductor 22 are superimposed on planar radiation conductor 11 when viewed in a z-axis direction.

As shown in FIG. 3C, first strip conductor 21 has one end connected, for example, to a via conductor 23 that extends in the z-axis direction. Via conductor 23 supplies signal power to first strip conductor 21. Via conductor 23 may pass through holes 31*c* and 32*c* provided in antenna ground conductor 31 and common ground conductor 32 which will be described later and may be connected to a line or a transmission and reception circuit provided below common ground conductor 32.

Antenna ground conductor 31 is located between first and second strip conductors 21 and 22 and common ground conductor 32. In the present embodiment, antenna ground conductor 31 is in a rectangular shape including two sets of sides in parallel to the x-axis direction and the y-axis direction, and it is separate from antenna ground conductor 31 of adjacent planar antenna 50. When viewed in the z-axis direction, antenna ground conductor 31 is superimposed at least on the entire planar radiation conductor 11, and four sides of antenna ground conductor 31 are located outside planar radiation conductor 11. Antenna ground conductor 31 is connected to a reference potential through a not-shown via conductor or the like. Antenna ground conductor 31 adjusts a distribution of electromagnetic waves radiated from planar radiation conductor 11.

Common ground conductor 32 is a ground electrode connected to the reference potential, and arranged in a region that is larger than planar radiation conductor 11 when viewed in the z-axis direction and includes at least a region below planar radiation conductor 11. In the present embodiment, common ground conductor 32 is connected to common ground conductor 32 of adjacent planar antenna 50 to form one layer.

Planar antenna 50 includes at least one pair of passive conductors. In the present embodiment, planar antenna 50 includes four passive conductors 12, 13, 14, and 15. Each of passive conductors 12, 13, 14, and 15 includes a side at an angle of 45±3° or −45±3° with respect to the x-axis and opposed to planar radiation conductor 11. Specifically, passive conductors 12, 13, 14, and 15 include sides 12*d*, 13*d*, 14*d*, and 15*d*, respectively. Side 13*d* and side 15*d* are at an angle of 45±3° with respect to the x-axis and opposed to planar radiation conductor 11. Side 13*d* and side 15*d* are opposed to each other with planar radiation conductor 11 lying therebetween. Similarly, side 12*d* and side 14*d* are at an angle of −45±3° with respect to the x-axis and opposed to planar radiation conductor 11. Side 12*d* and side 14*d* are opposed to each other with planar radiation conductor 11 lying therebetween. Sides 12*d*, 13*d*, 14*d*, and 15*d* each have a length, for example, within a range from 0.5 to 2.5 mm, with a 28-GHz band being assumed.

When the angle formed between each of sides 12*d*, 13*d*, 14*d*, and 15*d* and the x-axis is 45±3° or −45±3°, an effect of suppression of unintended interference between planar antennas 50 is obtained as will be described later. This effect, however, can be obtained even when the angle is slightly different from these angles. Difference in angle approximately as large as an alignment error at the time of manufacturing may be permitted. Specifically, the angle formed between each of sides 12*d*, 13*d*, 14*d*, and 15*d* and the x-axis may be, for example, approximately 45±3° or −45±3°. This is also applicable to a constituent element arranged at 45±3° or −45±3° with the x-axis being defined as the reference in embodiments below. When a condition under which a reflection function is performed at sides 12*d*, 13*d*, 14*d*, and 15*d* of respective passive conductors 12, 13, 14, and 15 or at a side of the antenna ground conductor which will be described later is satisfied, these sides can also be modified within a range of 45±30° or −45±30° with respect to the x-axis.

In the present embodiment, passive conductors 12, 13, 14, and 15 are each in a strip shape that extends in a direction in parallel to sides 12*d*, 13*d*, 14*d*, and 15*d*. Opposing ends of the strip shape are diagonally cut to substantially conform to four sides of antenna ground conductor 31 when viewed in the z-axis direction. Therefore, passive conductors 12, 13, 14, and 15 are in a trapezoidal shape when viewed in the z-axis direction. Passive conductors 12, 13, 14, and 15, however, may be in another shape so long as they include sides 12*d*, 13*d*, 14*d*, and 15*d*, respectively. For example, passive conductors 12, 13, 14, and 15 may be in a triangular shape including sides 12*d*, 13*d*, 14*d*, and 15*d*, respectively.

Sides 12*d*, 13*d*, 14*d*, and 15*d* are preferably arranged at positions of nodes, or in the vicinity of the nodes, of electromagnetic waves radiated from planar radiation conductor 11. As shown in FIG. 3A, a distance L from the center of planar radiation conductor 11 to side 12*d* preferably satisfies relation, for example, of $0.8\lambda \leq L \leq 1.2\lambda$ or $1.6\lambda \leq L \leq 2.4\lambda$. Positions of sides 13*d*, 14*d*, and 15*d* also preferably satisfy the same condition. As each side of planar radiation conductor 11 is arranged at the position of the node of electromagnetic waves, electromagnetic waves can be reflected under a stable condition.

Planar radiation conductor 11 and passive conductors 12, 13, 14, and 15 are preferably located substantially at the same height in the z-axis direction. For example, in the z-axis direction, planar radiation conductor 11 and passive conductors 12, 13, 14, and 15 are flush with each other. Passive conductors 12, 13, 14, and 15 are elements not supplied with electric power, and they are not supplied with electric power from first strip conductor 21 and second strip conductor 22.

Planar antenna 50 includes dielectric 40. In the present embodiment, planar radiation conductor 11, first strip conductor 21, second strip conductor 22, passive conductors 12, 13, 14, and 15, antenna ground conductor 31, and common ground conductor 32 are arranged in dielectric 40. Dielectrics 40 of planar antennas 50 are integrally formed and in a shape of a parallelepiped having a longitudinal direction in the x-axis direction. For example, dielectric 40 is in a shape of a parallelepiped including main surfaces 40*a* and 40*b* and side surfaces 40*c*, 40*d*, 40*e*, and 40*f*. Main surfaces 40*a* and 40*b* are two surfaces larger than other surfaces among six surfaces of the parallelepiped. Main surfaces 40*a* and 40*b* are in parallel to planar radiation conductor 11, antenna ground conductor 31, and common ground conductor 32. Planar antennas 50 are aligned in the x-axis direction as described above. An alignment pitch of the plurality of planar antennas 50 in the x-axis direction is approximately λ/2.

In each planar antenna 50, first strip conductor 21, second strip conductor 22, antenna ground conductor 31, and common ground conductor 32 are arranged in dielectric 40. Planar radiation conductor 11 and passive conductors 12, 13, 14, and 15 are arranged on main surface 40*a* of dielectric 40 or in the inside of dielectric 40. Since planar radiation conductor 11 is an element that emits electromagnetic waves, it is preferably arranged on main surface 40*a* from a point of view of enhanced radiation efficiency. When planar radiation conductor 11 and passive conductors 12, 13, 14, and 15 are exposed at main surface 40*a*, however, these elements may be deformed by external force or may be oxidized or corroded due to exposure to an external environment. According to the studies conducted by the inventor of the present application, it has been found that, when a dielectric that covers planar radiation conductor 11 has a thickness not more than 70 μm, radiation efficiency equal to or higher than in an example where planar radiation conductor 11 is formed on main surface 40*a* and an Au/Ni plated layer is further formed as a protective film can be achieved. Since loss is less as a portion 40*h* of dielectric 40 that covers planar radiation conductor 11 and passive conductors 12, 13, 14, and 15 has a less thickness t, the lower limit is not particularly restricted from a point of view of antenna characteristics. When thickness t is too thin, however, depending on a method of forming dielectric 40, it may be difficult to have uniform thickness t. For example, in order to form dielectric 40 from a multi-layer ceramic body, for example, thickness t is preferably equal to or more than 5 μm. In other words, thickness t is more preferably not less than 5 μm and not more than 70 μm. In particular, in order to achieve reflection efficiency equal to or higher than that of a planar antenna plated with Au/Ni even in employing ceramics having a low relative permittivity approximately from 5 to 10 as dielectric 40, thickness t is preferably not less than 5 μm and less than 20 μm.

Dielectric 40 may be composed of a resin, glass, or ceramics having a relative permittivity approximately from 1.5 to 100. Preferably, dielectric 40 is a multi-layer dielectric in which a plurality of layers composed of a resin, glass, or ceramics are layered. Dielectric 40 is, for example, a multi-layer ceramic body including a plurality of ceramic layers. Planar radiation conductor 11, first strip conductor 21, second strip conductor 22, passive conductors 12, 13, 14, and 15, antenna ground conductor 31, and common ground conductor 32 are provided between the ceramic layers, and via conductor 23 is provided in one or more ceramic layers. Planar radiation conductor 11 and passive conductors 12, 13, 14, and 15 are preferably provided on the same ceramic layer among the plurality of ceramic layers. Planar radiation conductor 11 and passive conductors 12, 13, 14, and 15, however, may be arranged on different ceramic layers among the plurality of ceramic layers, so long as a distance between the planar radiation conductor and the passive conductor is within the above-described range of thickness t in the z-axis direction described above.

Positions in the z-axis direction in dielectric 40, of planar radiation conductor 11, first strip conductor 21, second strip conductor 22, passive conductors 12, 13, 14, and 15, antenna ground conductor 31, and common ground conductor 32, that is, an interval between elements, can be adjusted by changing a thickness of the ceramic layer and the number of ceramic layers arranged between the constituent elements.

The constituent element of planar antenna 50 described above is formed of an electrically conductive material. For example, the constituent element is formed of a material including a metal such as Au, Ag, Cu, Ni, Al, Mo, and W.

Planar array antenna 101 can be made of a dielectric composed of the material described above and a conductive material, based on a known technique. In particular, the planar array antenna can suitably be made based on a multi-layer (layered) substrate technique using a resin, glass, and ceramics. For example, when a multi-layer ceramic body is employed for dielectric 40, a co-fired ceramic substrate technique can suitably be used. In other words, planar array antenna 101 can be made as a co-fired ceramic substrate.

The co-fired ceramic substrate included in planar array antenna 101 may be a low temperature co-fired ceramic (LTCC) substrate or a high temperature co-fired ceramic (HTCC) substrate. From a point of view of high-frequency characteristics, use of the low temperature co-fired ceramic substrate may be preferred. A ceramic material and a conductive material in conformity with a firing temperature, an application, and a frequency of wireless communication are used for dielectric 40, planar radiation conductor 11, first strip conductor 21, second strip conductor 22, antenna ground conductor 31, and common ground conductor 32. A conductive paste for forming these elements and a green sheet for forming a multi-layer ceramic body of dielectric 40 are co-fired. When the co-fired ceramic substrate is the low temperature co-fired ceramic substrate, a ceramic material and a conductive material that can be sintered within a temperature range approximately from 800° C. to 1000° C. are used. For example, a ceramic material containing Al, Si, Sr as a main component and containing Ti, Bi, Cu, Mn, Na, K as a sub component, a ceramic material containing Al, Si, Sr as a main component and containing Ca, Pb, Na, K as a sub component, a ceramic material containing Al, Mg, Si, Gd, and a ceramic material containing Al, Si, Zr, Mg are used. A conductive material containing Ag or Cu is used. The ceramic material has a dielectric constant approximately from 3 to 15. When the co-fired ceramic substrate is the high temperature co-fired ceramic substrate, a ceramic material mainly composed of Al and a conductive material containing tungsten (W) or molybdenum (Mo) can be used.

More specifically, various materials such as an Al—Mg—Si—Gd—O-based dielectric material having a low dielectric constant (a relative permittivity from 5 to 10), a dielectric material composed of a crystal phase made of $Mg_2SiO_4$ and Si—Ba-La—B—O-based glass, an Al—Si—Sr—O-based dielectric material, an Al—Si—Ba—O-based dielectric material, and a Bi—Ca—Nb—O-based dielectric material having a high dielectric constant (having a relative permittivity not lower than 50) can be employed as the LTCC material.

For example, when the Al—Si—Sr—O-based dielectric material contains an oxide of Al, Si, Sr, Ti as a main component, with Al, Si, Sr, Ti representing the main component being calculated as $Al_2O_3$, $SiO_2$, SrO, $TiO_2$, it preferably contains 10 to 60 mass % of $Al_2O_3$, 25 to 60 mass % of $SiO_2$, 7.5 to 50 mass % of SrO, and/or at most 20 mass % (including 0) of $TiO_2$. In addition, with respect to 100 parts by mass of the main component, the Al—Si—Sr—O-based dielectric material preferably contains as the sub component, at least one in the group of Bi, Na, K, and Co calculated as $Bi_2O_3$, $Na_2O$, $K_2O$, and/or CoO, as follows: 0.1 to 10 parts by mass of $Bi_2O_3$, 0.1 to 5 parts by mass of $Na_2O$, 0.1 to 5 parts by mass of $K_2O$, and/or 0.1 to 5 parts by mass of CoO. Furthermore, with respect to 100 parts by mass of the main component, the Al—Si—Sr—O-based dielectric material preferably contains as the sub component, at least one in the group of Cu, Mn, and Ag, with Cu and Mn being calculated as CuO and $Mn_3O_4$, as follows: 0.01 to 5 parts by mass of CuO, 0.01 to 5 parts by mass of $Mn_3O_4$, and/or 0.01 to 5 parts by mass of Ag. In addition, the Al—Si—Sr—O-based dielectric material can also contain an inevitable impurity.

Figure 4A:
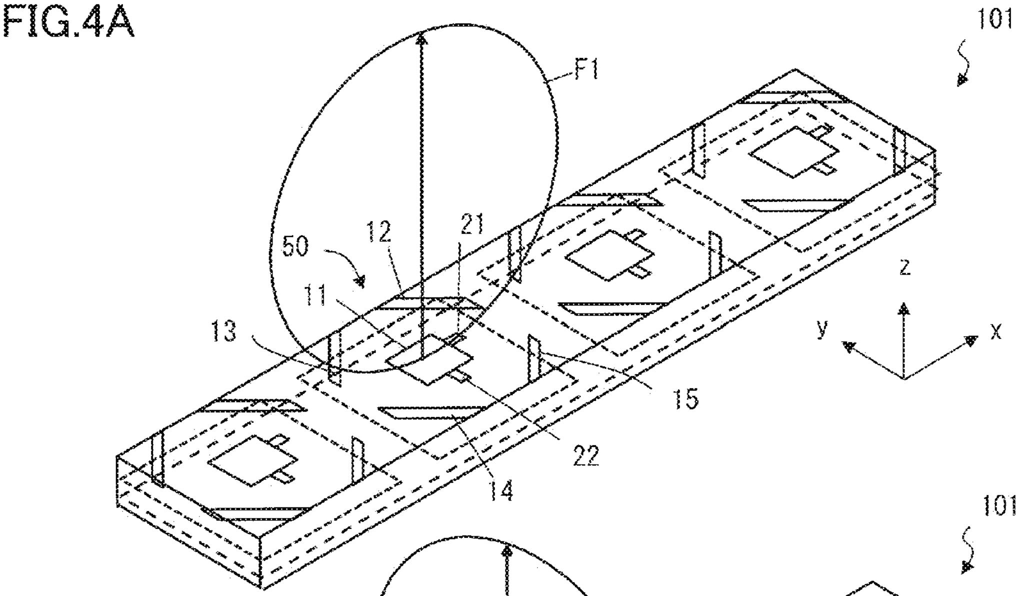
FIG. 4A is a schematic diagram illustrating an intensity distribution of electromagnetic waves radiated from the planar antenna shown in FIG. 1.

An operation of planar array antenna 101 will be described with reference to FIGS. 4A to 4C. When signal power is fed to planar radiation conductor 11 of each planar antenna 50 through first strip conductor 21 in planar array antenna 101, as shown in FIG. 4A, planar radiation conductor 11 of each planar antenna 50 generally emits electromagnetic waves having an intensity distribution F1 that has maximum intensity in a direction perpendicular to planar radiation conductor 11, that is, in a positive direction of the z-axis, and extends over an xz plane in parallel to a direction of extension of first strip conductor 21.

Figure 4B:
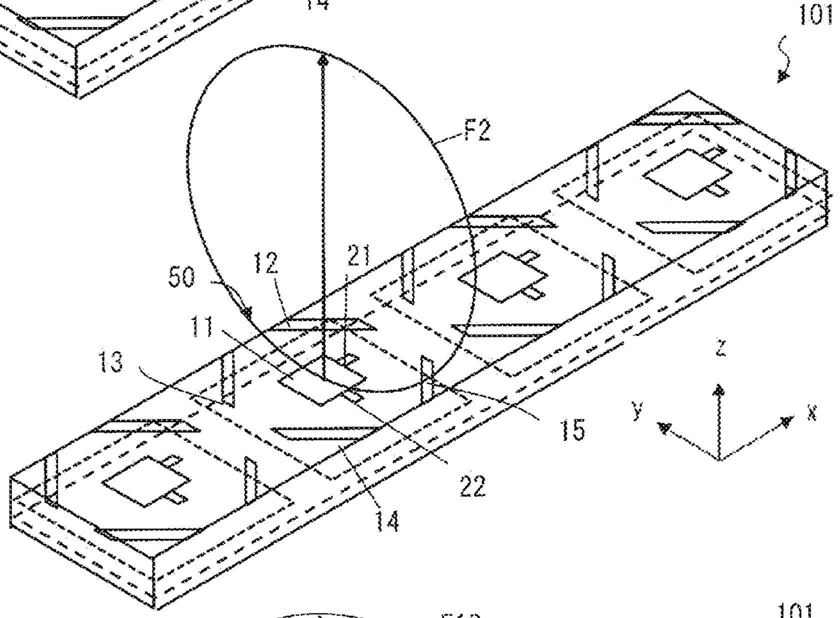
FIG. 4B is a schematic diagram illustrating an intensity distribution of electromagnetic waves radiated from the planar antenna shown in FIG. 1.
Figure 4C:
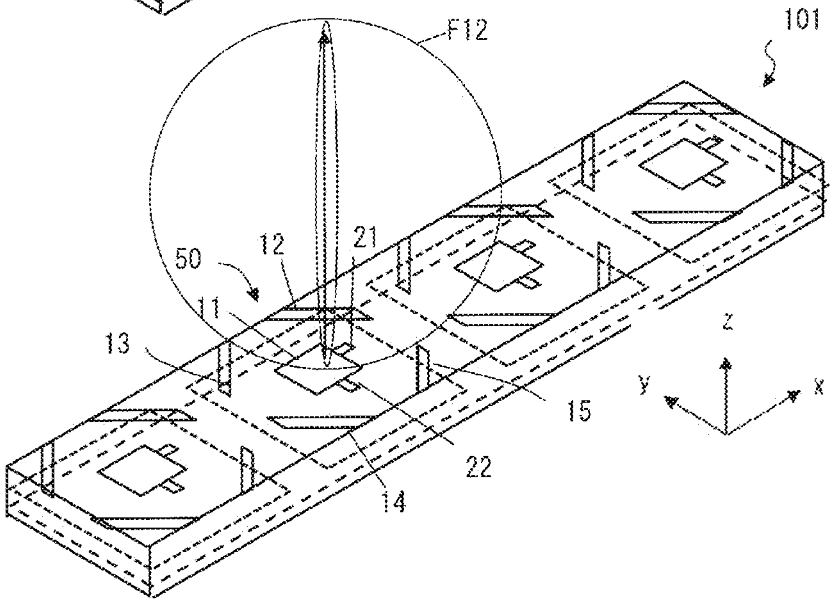
FIG. 4C is a schematic diagram illustrating an intensity distribution of electromagnetic waves radiated from the planar antenna shown in FIG. 1.

When signal power is fed to planar radiation conductor 11 of each planar antenna 50 through second strip conductor 22, as shown in FIG. 4B, planar radiation conductor 11 of each planar antenna 50 generally emits electromagnetic waves having an intensity distribution F2 that has maximum intensity in the direction perpendicular to planar radiation conductor 11, that is, in the positive direction of the z-axis, and extends over a yz plane in parallel to a direction of extension of second strip conductor 22.

Therefore, when signal power is simultaneously supplied to first strip conductor 21 and second strip conductor 22, planar radiation conductor 11 emits electromagnetic waves that have an intensity distribution F12 resulting from combination of electromagnetic waves having intensity distribution F1 and electromagnetic waves having intensity distribution F2. Electromagnetic waves having intensity distribution F12 extend over a plane defined by turning the xz plane around the z-axis by 45±3° with respect to the x-axis and a plane defined by turning the xz plane around the z-axis by −45±3° with respect to the x-axis. Therefore, passive conductors 12, 13, 14, and 15 each including the side at the angle of 45±3° or −45±3° with respect to the x-axis reflect or attenuate the combined electromagnetic waves, and such unfavorable influence as unintended interference onto electromagnetic waves radiated from adjacent planar antenna 50 can be suppressed.

Electromagnetic waves having intensity distribution F1 resulting from signal power supplied through first strip conductor 21 are orthogonal to electromagnetic waves having intensity distribution F2 resulting from signal power supplied through second strip conductor 22. Therefore, even when signal power is simultaneously supplied through first strip conductor 21 and second strip conductor 22 to planar radiation conductor 11, the combined electromagnetic waves can be received and a generated signal can be split into two signals. Therefore, according to planar array antenna 101, different signal power can be radiated from planar radiation conductor 11 through first strip conductor 21 and second strip conductor 22, and more information can be transmitted and received. Since unfavorable influence by interference between planar antennas 50 can be suppressed in planar array antenna 101, a planar array antenna capable of beam forming higher in directivity can be realized.

When planar antennas 50 do not form an array as well, passive conductors 12, 13, 14, and 15 can suppress unfavorable spread of electromagnetic waves as described above. Therefore, even when a single planar antenna 50 alone is arranged in a wireless device, unfavorable influence onto a circuit or other antennas arranged around planar antenna 50 can be suppressed.

As described above, planar array antenna 101 can achieve an excellent effect when it simultaneously receives inputs of signal power different from each other at first strip conductor 21 and second strip conductor 22 and combines two electromagnetic waves to radiate combined electromagnetic waves. The planar array antenna, however, may receive input of signal power at one of first strip conductor 21 and second strip conductor 22 and radiate electromagnetic waves. Since passive conductors 12, 13, 14, and 15 can suppress unfavorable influence between planar antennas 50 also in this case, a planar array antenna capable of beam forming higher in directivity can be realized. Specifically, planar radiation conductor 11 can simultaneously transmit and receive orthogonal polarized waves such as vertically polarized wave and horizontally polarized waves with higher quality, so that a communication rate can be improved. In input and output of signal power to and from one of first strip conductor 21 and second strip conductor 22 as well, signal power high in quality can be transmitted and received. Furthermore, planar array antenna 101 can improve coverage mainly over a zx plane in FIG. 1 by providing a phase difference and an amplitude difference to incoming signal power between planar antennas 50 and by carrying out beam forming.

Figure 5:
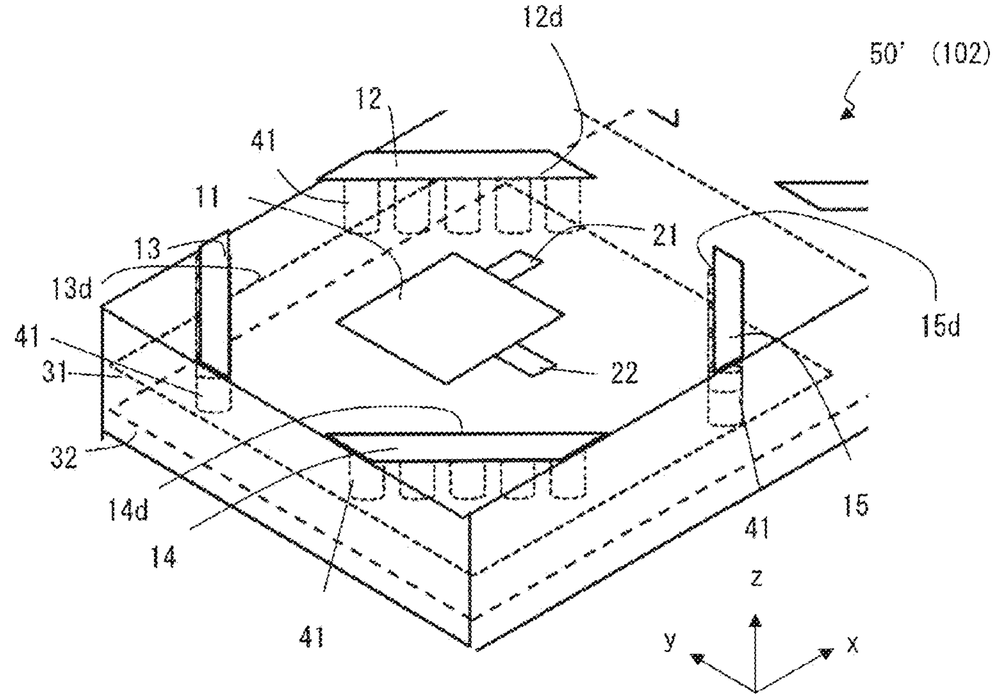
FIG. 5 is a perspective view showing as being enlarged, a planar antenna in another form of a planar array antenna.

Planar array antenna 101 can variously be modified. FIG. 5 is a perspective view showing as being enlarged, one of planar antennas 50' of a planar array antenna 102. Planar array antenna 102 is different from planar array antenna 101 in that a plurality of planar antennas 50' are included and planar antenna 50' includes at least one first via conductor 41 that connects passive conductors 12, 13, 14, and 15 to antenna ground conductor 31. In the present embodiment, planar antenna 50' includes a plurality of first via conductors 41 arranged between passive conductors 12, 13, 14, and 15 and antenna ground conductor 31. Specifically, a plurality of first via conductors 41 aligned in the direction at an angle of −45±3° with respect to the x-axis are arranged between passive conductor 12 and antenna ground conductor 31. Each first via conductor has one end connected to passive conductor 12 and has the other end connected to antenna ground conductor 31. Similarly, a plurality of first via conductors 41 are arranged also between passive conductor 13 and antenna ground conductor 31, between passive conductor 14 and antenna ground conductor 31, and between passive conductor 15 and antenna ground conductor 31. First via conductor 41 has a diameter, for example, from several micrometers to several hundred micrometers, and a pitch (a distance between axes) between first via conductors 41 is, for example, not more than ⅛ λd, preferably not more than 1/16 λd. Though a gap is provided between a plurality of first via conductors 41 in FIG. 5, side surfaces of first via conductors 41 may be in contact with each other.

According to planar array antenna 102, the plurality of first via conductors 41 arranged between passive conductors 12, 13, 14, and 15 and antenna ground conductor 31 function as a shield. Therefore, electromagnetic waves radiated from planar radiation conductor 11 of each planar antenna 50' are confined in a region surrounded by the plurality of first via conductors 41 and are less likely to leak to adjacent planar antenna 50'. Therefore, a planar array antenna capable of achieving suppression of unfavorable influence between planar antennas 50' and beam forming higher in directivity can be realized.

Figure 6:
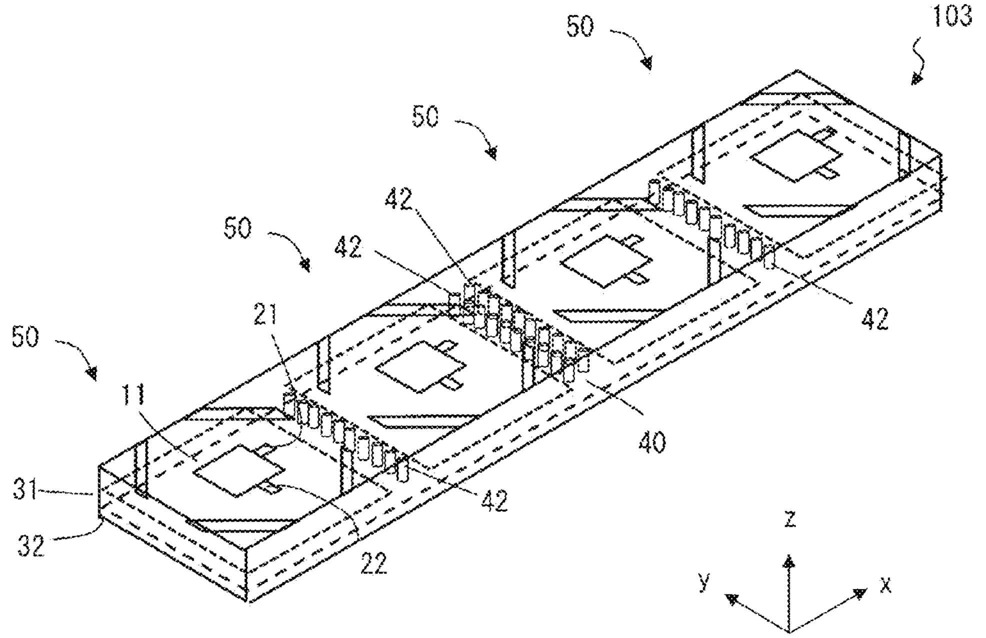
FIG. 6 is a perspective view showing another form of a planar array antenna.

FIG. 6 is a perspective view showing a planar array antenna 103. Planar array antenna 103 is different from planar array antenna 101 in including a plurality of second via conductors 42 aligned in the y-axis direction between at least one pair of adjacent planar antennas 50 of a plurality of planar antennas 50. Second via conductor 42 extends along the z-axis direction and has one end connected to common ground conductor 32. Second via conductor 42 preferably has a height substantially equal to or more than a distance between common ground conductor 32 and planar radiation conductor 11 in the z-axis direction.

In the form shown in FIG. 6, planar array antenna 103 includes the plurality of second via conductors 42 aligned in the y-axis direction between each pair of planar antennas 50. One row or two rows of second via conductors 42 aligned in the y-axis direction is/are arranged between planar antennas 50. In the present embodiment, two rows of second via conductors 42 are arranged between second and third planar antennas 50 in the x-axis direction among four planar antennas 50.

When one row of second via conductors 42 is arranged between planar antennas 50, second via conductors 42 are not connected to but distant from antenna ground conductors 31 of two planar antennas 50 between which the second via conductors lie. When two rows of second via conductors 42 are arranged between planar antennas 50, second via conductors 42 may be connected to antenna ground conductors 31 of two respective planar antennas 50 between which the second via conductors lie. As with first via conductor 41, second via conductor 42 has a diameter, for example, from several micrometers to several hundred micrometers, and a pitch (a distance between axes) between second via conductors 42 is, for example, ⅛ λd or preferably not more than 1/16 λd. Though a gap is provided between the plurality of second via conductors 42 in FIG. 6, side surfaces of second via conductors 42 may be in contact with each other.

The plurality of second via conductors 42 aligned in the y-axis direction between one pair of planar antennas 50 function as the shield and suppress the leakage of electromagnetic waves radiated from planar radiation conductor 11 of planar antenna 50 into adjacent planar antenna 50. Therefore, a planar array antenna capable of suppressing the unfavorable influence between planar antennas 50 and beam forming higher in directivity can be realized.

Second Embodiment

Figure 7A:
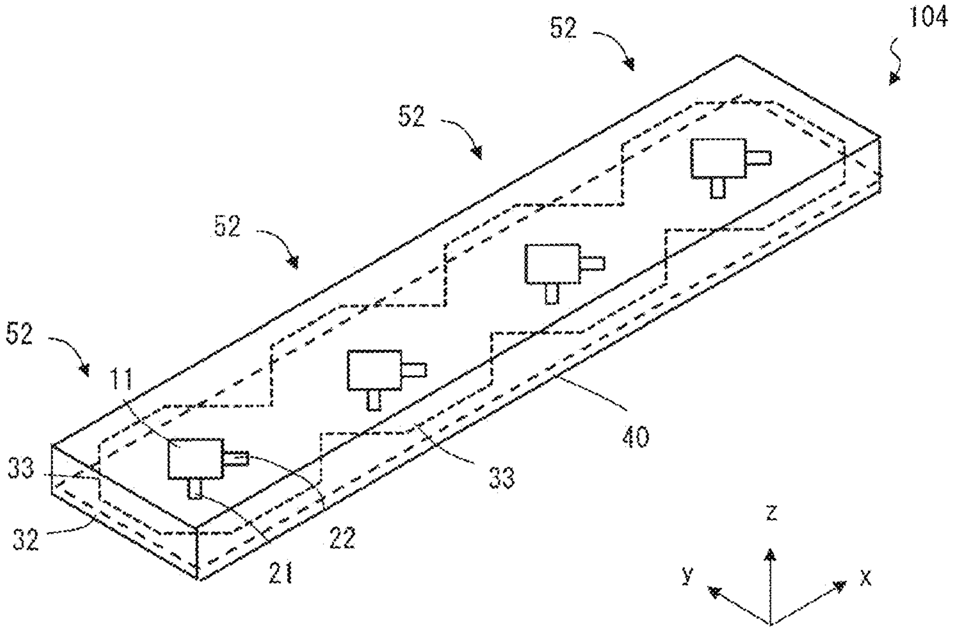
FIG. 7A is a perspective view showing a second embodiment of a planar antenna and a planar array antenna.
Figure 7B:
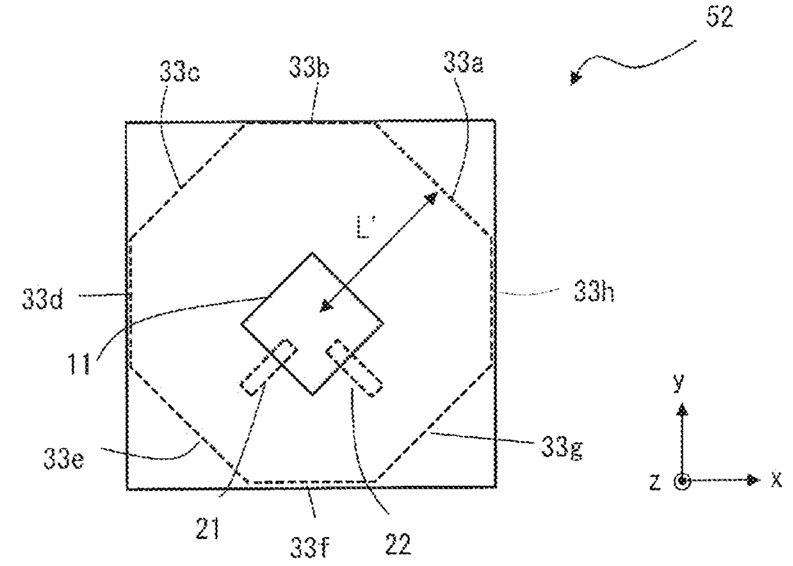
FIG. 7B is a plan view of the planar antenna shown in FIG. 7A.

A second embodiment of a planar antenna and a planar array antenna in the present disclosure will be described. FIG. 7A is a schematic perspective view showing a planar array antenna 104 in the present disclosure. FIG. 7B is a schematic enlarged perspective view of one planar antenna 52 of planar array antenna 104.

As in the first embodiment, planar array antenna 104 includes a plurality of planar antennas 52 aligned in the x-axis direction.

Each planar antenna 52 includes planar radiation conductor 11, first strip conductor 21, second strip conductor 22, an antenna ground conductor 33, and common ground conductor 32. Arrangement of planar radiation conductor 11, the first strip conductor, second strip conductor 22, antenna ground conductor 33, and common ground conductor 32 in the z-axis direction is the same as that in planar antenna 50 of planar array antenna 101.

In planar antenna 52, planar radiation conductor 11, first strip conductor 21, and second strip conductor 22 are arranged in a direction turned around the z-axis by −45±3° as compared with planar antenna 50. Specifically, second strip conductor 22 extends in a direction orthogonal to the direction of extension of first strip conductor 21.

Planar radiation conductor 11 is substantially in a square shape including two sets of sides in parallel to a straight line at an angle of 45±3° with respect to the x-axis and to a straight line at an angle of −45±3° with respect to the x-axis.

Antenna ground conductor 33 includes in an outer periphery thereof, at least one pair of sides at an angle of 45±3° or −45±3° with respect to the x-axis. In the present embodiment, antenna ground conductor 33 includes sides 33*a* to 33*h* around the outer periphery. Side 33*a* and side 33*e* are at an angle of −45±3° with respect to the x-axis, and side 33*c* and side 33*g* are at an angle of 45±3° with respect to the x-axis. The antenna ground conductor includes side 33*b* and side 33*f* in parallel to the x-axis and side 33*d* and side 33*h* in parallel to the y-axis. When viewed in the z-axis direction, side 33*a* and side 33*e* are located such that planar radiation conductor 11 lies therebetween, and side 33*c* and side 33*g* are located such that planar radiation conductor 11 lies therebetween.

In the present embodiment, antenna ground conductor 33 is connected to antenna ground conductor 33 of adjacent planar antenna 52. Specifically, except for planar antennas 52 at opposing ends in the x-axis direction, side 33*d* of antenna ground conductor 33 is connected to side 33*h* of antenna ground conductor 33 of adjacent planar antenna 52. In planar antennas 52 located at opposing ends in the x-axis direction, side 33*h* or side 33*d* of antenna ground conductor 33 is connected to side 33*d* or 33*h* of antenna ground conductor 33 of adjacent conductor planar antenna 52.

Sides 33*a*, 33*c*, 33*e*, and 33*g* are preferably arranged at positions of nodes, or in the vicinity of the nodes, of electromagnetic waves radiated from planar radiation conductor 11. As shown in FIG. 7B, a distance L' from the center of planar radiation conductor 11 to side 33*a* preferably satisfies relation, for example, of $0.8\lambda \leq L' \leq 1.2\lambda$ or $1.6\lambda \leq L' \leq 2.4\lambda$. Positions of sides 33*c*, 33*e*, and 33*g* also preferably satisfy the same condition.

When signal power is fed to planar radiation conductor 11 through first strip conductor 21 and second strip conductor 22 in each planar antenna 52 in planar array antenna 104, planar radiation conductor 11 emits the combined electromagnetic waves resulting from two signal powers that have an intensity distribution having maximum intensity in the positive direction of the z-axis and extending over the xz plane and yz plane. In planar array antenna 104, planar antennas 52 are aligned at a regular pitch or a pitch close thereto in the x-axis direction. Planar radiation conductor 11, first strip conductor 21, and second strip conductor 22 are arranged as being turned in the direction at the angle of −45±3 degrees with respect to the longitudinal direction. Sides 33*a*, 33*e*, 33*c*, and 33*g* of antenna ground conductor 33 are thus located in two resonance directions (directions at 45° and −45° with respect to the x-axis) of planar antenna 52, an electromagnetic length (a resonator length) of planar antenna 52 is equivalent between the two resonance directions, and influence by interference with an unintended adjacent antenna can be lessened.

According to planar array antenna 104, antenna ground conductor 33 of each planar antenna 52 includes sides 33*a*, 33*c*, 33*e*, and 33*g* at the above-described angle with respect to the x-axis. Therefore, these sides reflect or attenuate electromagnetic waves, and unfavorable influence such as unintended interference onto electromagnetic waves radiated from adjacent planar antenna 52 is suppressed. Therefore, a planar array antenna capable of beam forming higher in directivity can be realized.

Figure 15:
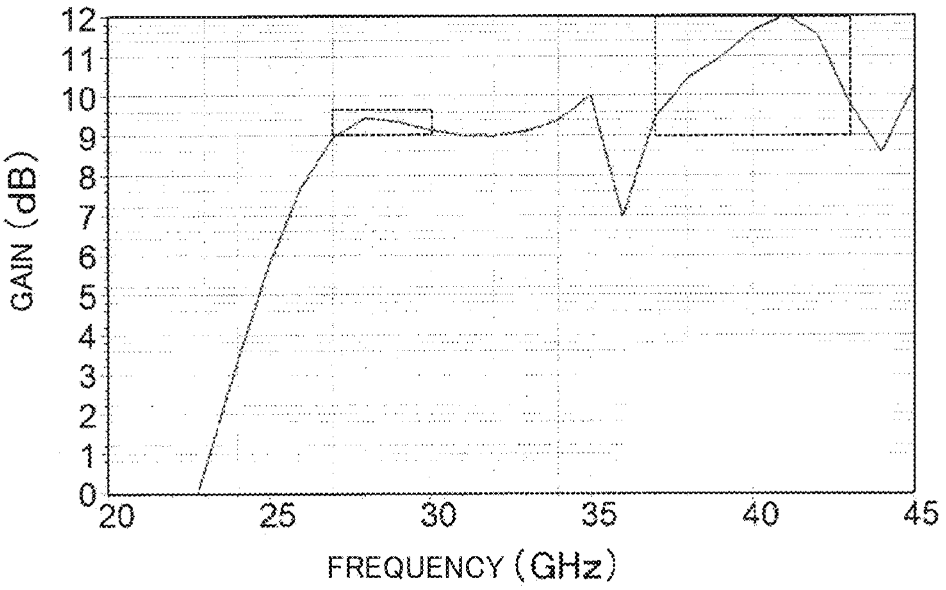
FIG. 15 shows frequency characteristics found by simulation, of a peak gain of electromagnetic waves radiated from the planar array antenna in the present embodiment.
Figure 16:
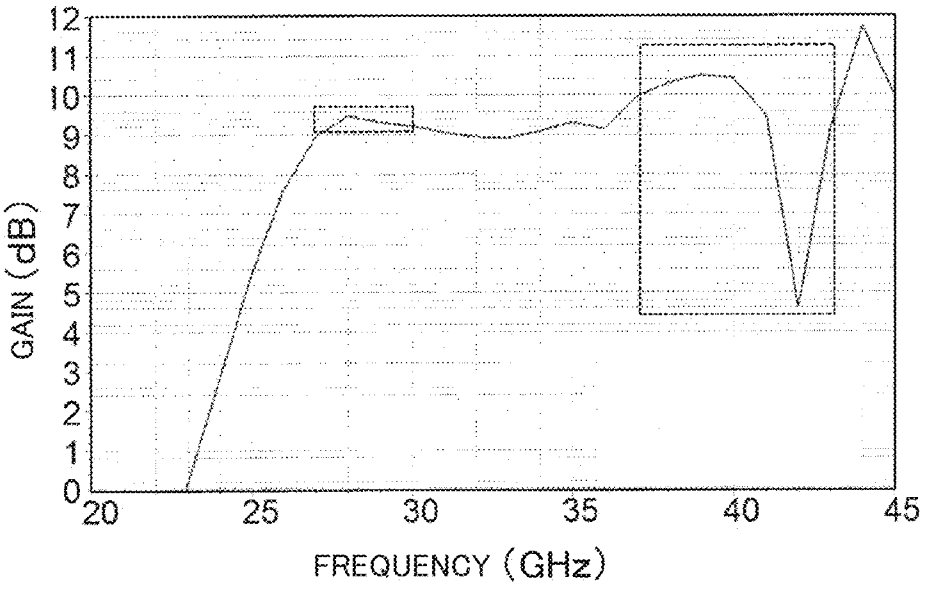
FIG. 16 shows frequency characteristics found by simulation, of a peak gain of electromagnetic waves radiated from a planar array antenna without an antenna ground conductor.

FIG. 15 shows frequency characteristics found by simulation, of a peak gain of electromagnetic waves radiated from planar array antenna 104 in the present embodiment. The abscissa represents a frequency and the ordinate represents a maximum gain that can be achieved regardless of a direction. For comparison, FIG. 16 shows frequency characteristics of a peak gain of a planar antenna without antenna ground conductor 33. In two frequency bands from 27 GHz to 30 GHz and from 37 GHz to 43 GHz, a gain not lower than 9 dB is obtained. In particular, in the band from 37 GHz to 43 GHz, gain of 12 dB at the maximum is obtained. In contrast, as shown in FIG. 16, in the planar antenna without antenna ground conductor 33, a gain is significantly lowered at a frequency not lower than 41 GHz in the band from 37 GHz to 43 GHz. This may be because interference between electromagnetic waves radiated from adjacent planar antennas 52 occurs at the frequency not lower than 41 GHz and the gain has lowered.

Figure 8:
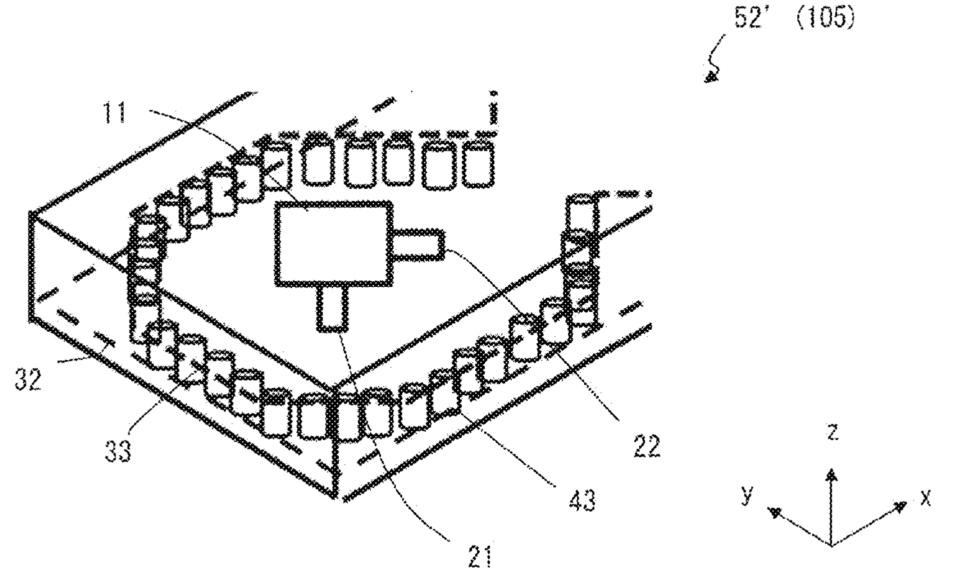
FIG. 8 is a perspective view showing as being enlarged, a planar antenna in another form of a planar array antenna.

Planar array antenna 104 can variously be modified. FIG. 8 is a perspective view showing as being enlarged, one of planar antennas 52' of a planar array antenna 105. Planar array antenna 105 is different from planar array antenna 104 in that a plurality of planar antennas 52' are included and planar antenna 52' includes at least one third via conductor 43 that connects antenna ground conductor 33 and common ground conductor 32 to each other. In the present embodiment, planar antenna 52' includes a plurality of third via conductors 43. The plurality of third via conductors 43 are arranged along the outer periphery of antenna ground conductor 33, and the third via conductor has one end connected to antenna ground conductor 33 and the other end connected to common ground conductor 32. A diameter of and a pitch between third via conductors 43 may be as large as those of second via conductors 42. Though a gap is provided between the plurality of third via conductors 43 in FIG. 8, side surfaces of third via conductors 43 may be in contact with each other.

The plurality of third via conductors 43 function as the shield and suppress the leakage of electromagnetic waves radiated from planar radiation conductor 11 of planar antenna 52' into adjacent planar antenna 52'. Therefore, a planar array antenna capable of suppressing unfavorable influence between planar antennas 52' and beam forming higher in directivity can be realized.

Figure 17A:
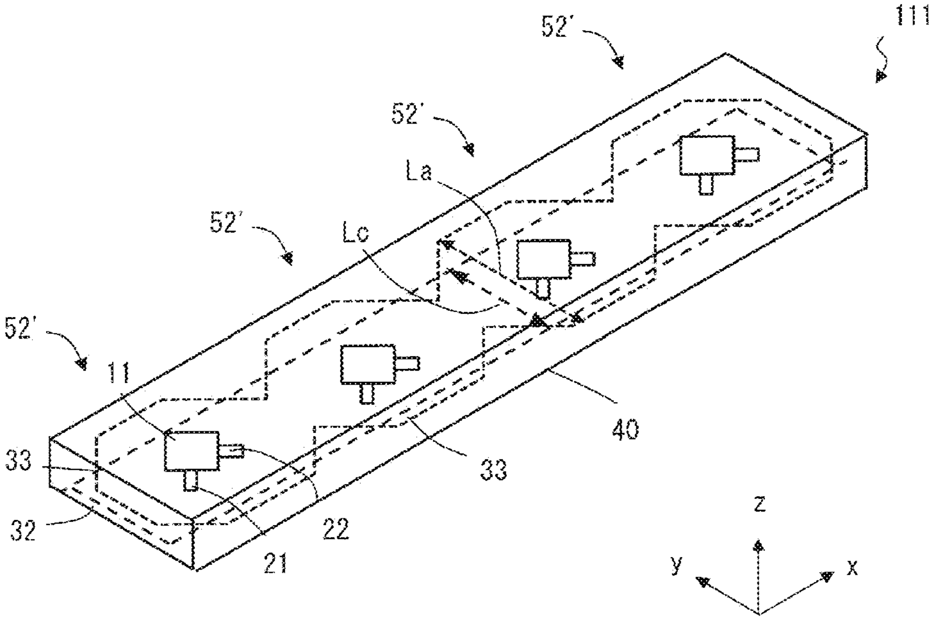
FIG. 17A is a perspective view of another form of a planar antenna and a planar array antenna.
Figure 17B:
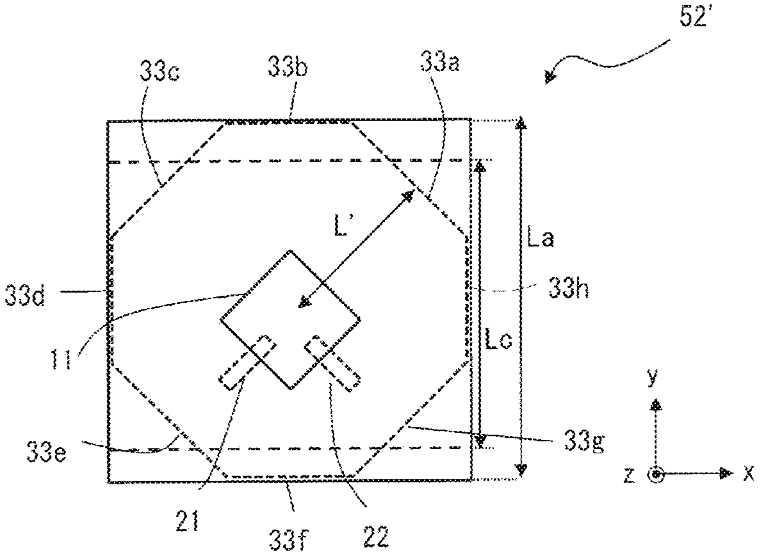
FIG. 17B is a plan view of the planar antenna shown in FIG. 17A.

FIG. 17A is a perspective view of planar antenna 52' and a planar array antenna 111, and FIG. 17B is a plan view of the planar antenna shown in FIG. 17A. Planar antenna 52' and planar array antenna 111 are different from planar antenna 52 and planar array antenna 104 in the second embodiment in that a width Lc of common ground conductor 32 in the direction in parallel to the y-axis is less than a maximum width La of antenna ground conductor 33 in parallel to the y-axis. Maximum width La in parallel to the y-axis of antenna ground conductor 33 means, for example, an interval between side 33*b* and side 33*f* as shown in FIG. 17B.

As described above, width Lc of common ground conductor 32 in the direction in parallel to the y-axis and maximum width La of antenna ground conductor 33 in parallel to the y-axis satisfy the relation in an expression (1) below. La and Lc preferably satisfy the relation in an expression (2) below, and more preferably satisfy the relation in an expression (3). λ represents a wavelength of carrier waves and ε represents a relative permittivity of dielectric 40.

$$Lc<La \quad (1)$$

$$Lc \le La-(\lambda/16)/(\sqrt{\varepsilon}) \quad (2)$$

$$Lc \le La-(\lambda/12)/(\varepsilon\varepsilon) \quad (3)$$

Further preferably, an expression (4) is satisfied.

$$Lc \le La-(\lambda/8)/(\sqrt{\varepsilon}) \quad (4)$$

Electromagnetic waves radiated from each planar antenna 52' have maximum intensity in the direction perpendicular to planar radiation conductor 11, that is, in the positive direction of the z-axis, unless planar antennas 52' interact with each other or planar array antenna 111 is characterized by its quadrangular two-dimensional shape, in particular, such a shape that common ground conductor 32 is longer in the X-axis direction than in the Y-axis direction. Depending on a condition for interaction between planar antennas 52' or asymmetry in shape of common ground conductor 32, however, a direction of maximum intensity of radiated electromagnetic waves may be inclined. By setting width Lc of common ground conductor 32 in the direction in parallel to the y-axis to be less than maximum width La of antenna ground conductor 33 in parallel to the y-axis in such a case, a condition for effective grounding that contributes to radiation of electromagnetic waves is mainly determined by antenna ground conductor 33, and influence by the shape of common ground conductor 32 is lessened. Therefore, the direction of maximum intensity of radiated electromagnetic waves can be closer to the positive direction of the z-axis.

Figure 18:
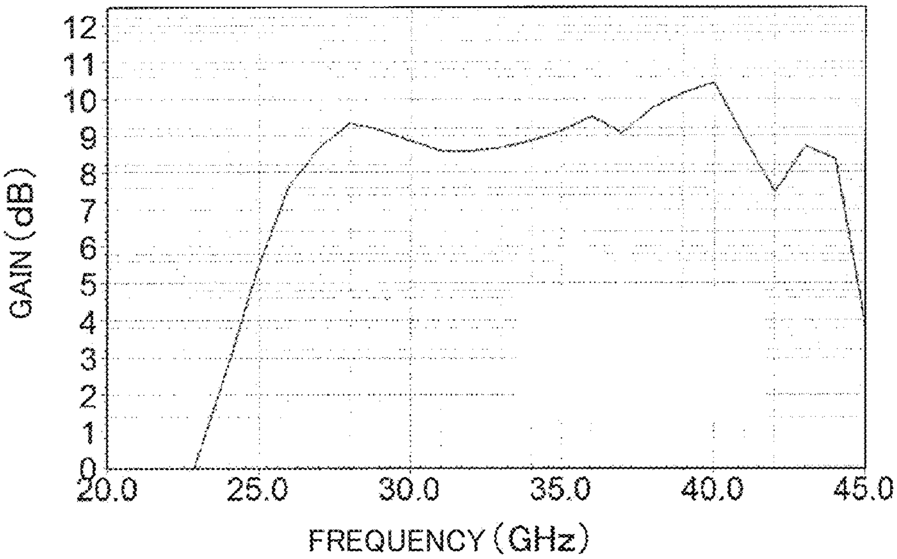
FIG. 18 shows frequency characteristics in a z-axis direction of electromagnetic waves radiated from a planar array antenna that are found by simulation.
Figure 19:
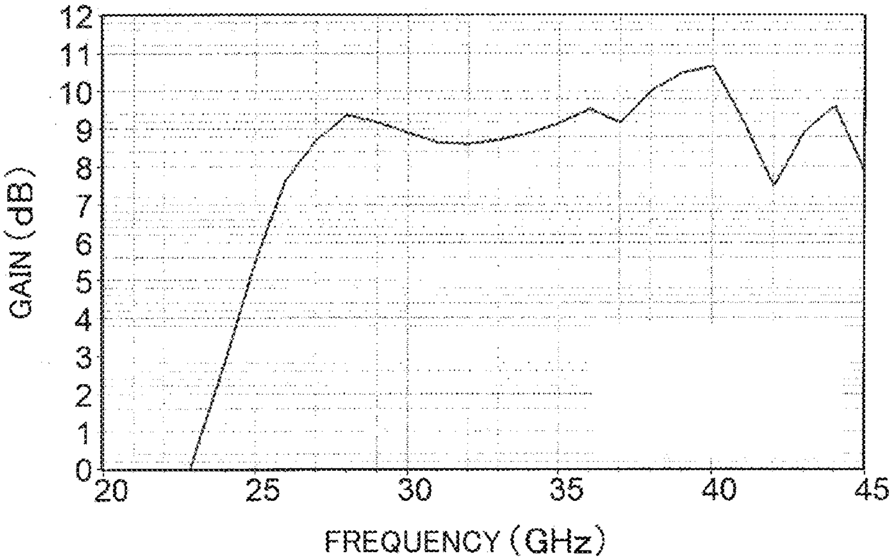
FIG. 19 shows frequency characteristics found by simulation, of a peak gain of electromagnetic waves radiated from a planar array antenna.

FIG. 18 shows frequency characteristics in the z-axis direction of electromagnetic waves radiated from planar array antenna 111 that are found by simulation. The abscissa represents a frequency and the ordinate represents a gain in the positive direction of the z-axis. FIG. 19 shows frequency characteristics of a peak gain of electromagnetic waves radiated from planar array antenna 111. The abscissa represents a frequency and the ordinate represents a maximum gain that can be achieved regardless of a direction. As is understood from the comparison between these figures, the frequency characteristics in the z-axis direction well match with the frequency characteristics of the peak gain of electromagnetic waves radiated from planar array antenna 111, and the intensity of radiated electromagnetic waves in the z-axis direction is highest within a range from 20 GHz to 45 GHz.

Third Embodiment

Figure 9:
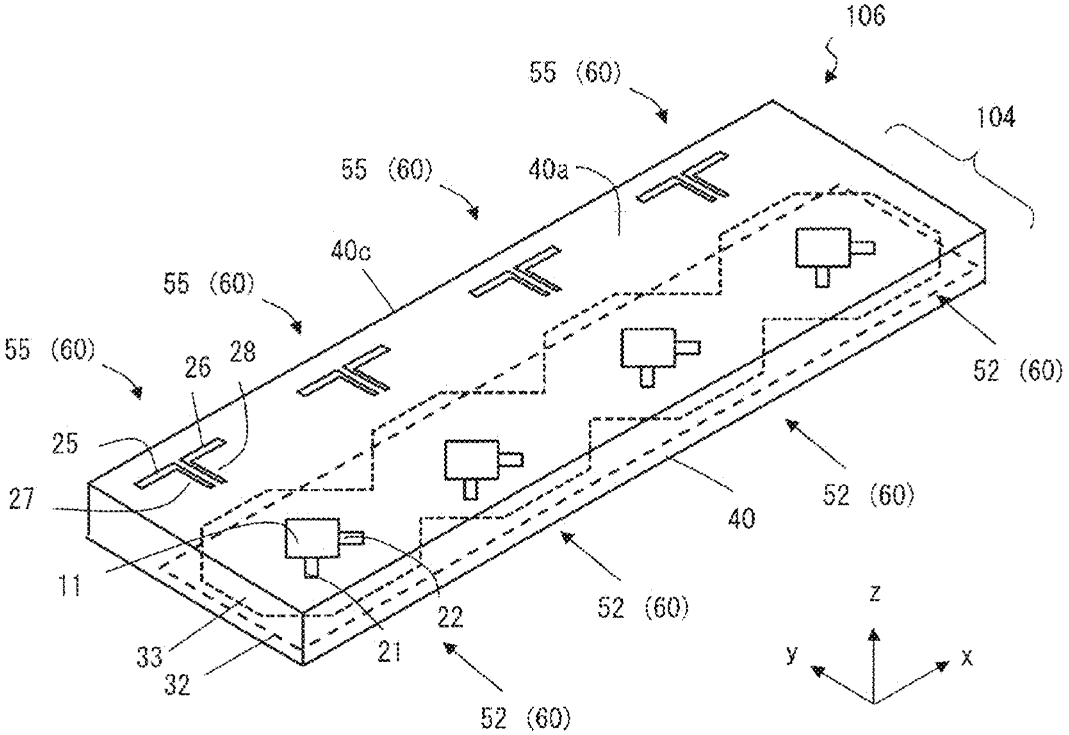
FIG. 9 is a perspective view showing an embodiment of a multi-axis array antenna.

An embodiment of a multi-axis antenna in the present disclosure will be described. FIG. 9 is a schematic perspective view showing a multi-axis array antenna 106 in the present disclosure. Multi-axis array antenna 106 includes planar array antenna 104 and a plurality of linear antennas 55. Planar array antenna 104 is identical in structure to planar array antenna 104 described in the second embodiment. Multi-axis array antenna 106 may include any of planar array antennas 101 to 103 and 105 in the first and second embodiments other than planar array antenna 104.

Each of a plurality of linear antennas 55 corresponds to one of the plurality of planar antennas 52 in planar array antenna 104 and is arranged at a distance in the y-axis direction. Each linear antenna 55 includes one linear radiation conductor or two linear radiation conductors that extend(s) in parallel to the x-axis direction. In a form shown in FIG. 9, linear antenna 55 includes linear radiation conductors 25 and 26. Linear radiation conductors 25 and 26 are in a stripe shape that extends in the x-axis direction and aligned in proximity to each other in the x-axis direction. One planar antenna 52 and one linear antenna 55 arranged in the y-axis direction constitute one antenna unit 60.

Linear antenna 55 further includes feed conductors 27 and 28 for supplying signal power to linear radiation conductors 25 and 26. Feed conductors 27 and 28 are in a stripe shape that extend in the y-axis direction. Feed conductors 27 and 28 have one ends connected to one ends of aligned linear radiation conductors 25 and 26 adjacent to each other.

When viewed in the z-axis direction, linear radiation conductors 25 and 26 of linear antenna 55 may or may not be superimposed on common ground conductor 32. When linear radiation conductors 25 and 26 of linear antenna 55 are not superimposed on common ground conductor 32 when viewed in the z-axis direction, linear radiation conductors 25 and 26 of linear antenna 55 are preferably distant by λ/8 or more from a periphery of common ground conductor 32 in the y-axis direction. When linear radiation conductors 25 and 26 are superimposed on common ground conductor 32 when viewed in the z-axis direction, common ground conductor 32 is preferably distant by λ/8 or more from linear radiation conductors 25 and 26 in the z-axis direction.

A part of linear antenna 55 including the other ends of feed conductors 27 and 28 may be superimposed on common ground conductor 32 when viewed in the z-axis direction. One of the other ends of feed conductors 27 and 28 is connected to the reference potential, and the other of them is supplied with signal power. Linear radiation conductors 25 and 26 have a length in the x-axis direction, for example, of approximately 1.2 mm. They have a length (width) in the y-axis direction, for example, of approximately 0.2 mm.

Figure 10A:
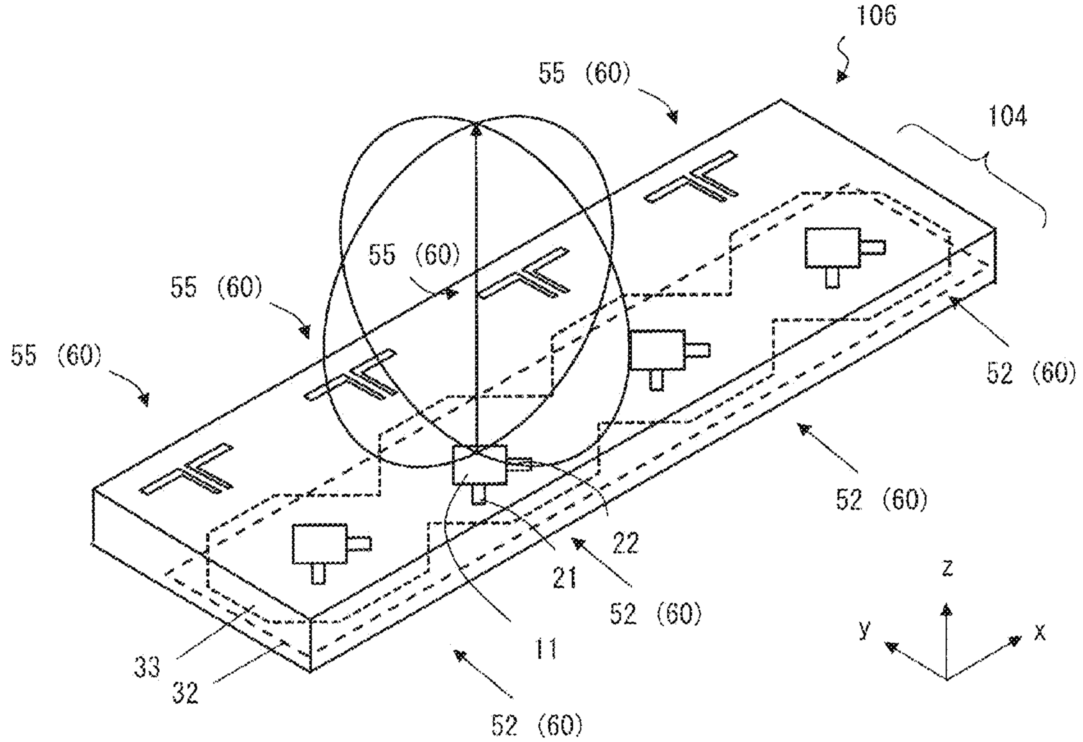
FIG. 10A is a schematic diagram illustrating an intensity distribution of electromagnetic waves radiated from the multi-axis array antenna shown in FIG. 9.
Figure 10B:
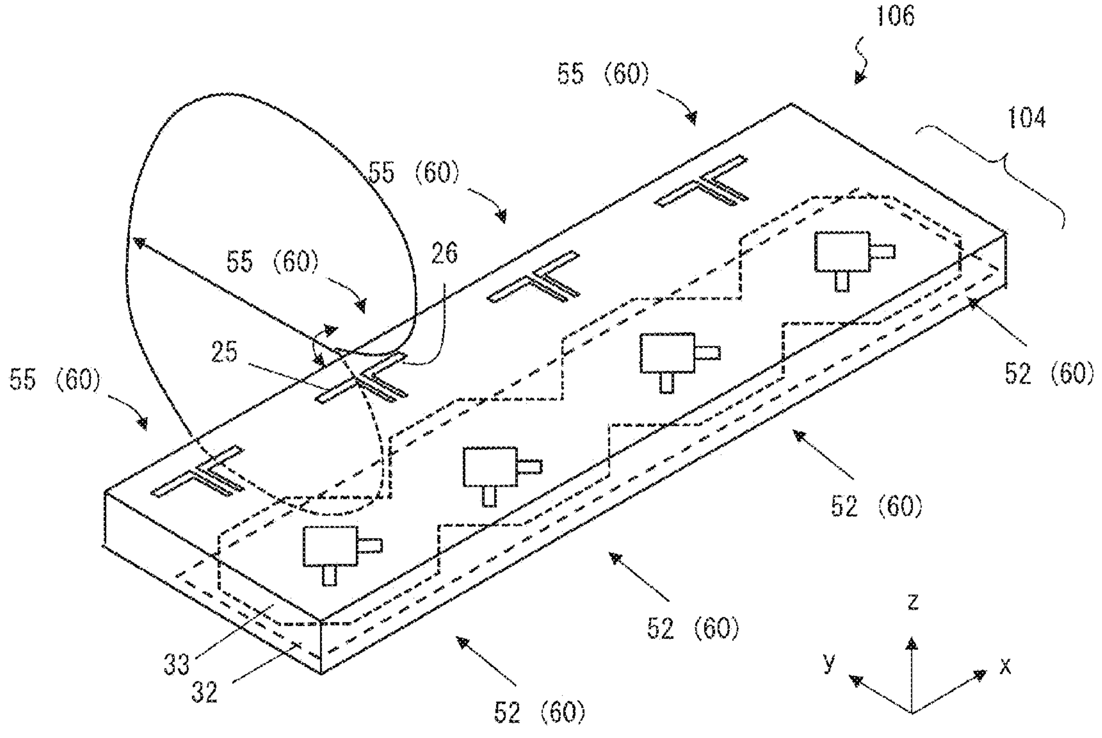
FIG. 10B is a schematic diagram illustrating an intensity distribution of electromagnetic waves radiated from the multi-axis array antenna shown in FIG. 9.

An operation of multi-axis array antenna 106 will be described with reference to FIGS. 10A and 10B. When signal power is simultaneously fed to planar antennas 52 of antenna units 60 through first strip conductors 21 and second strip conductors 22 in multi-axis antenna 106, as shown in FIG. 10A, planar radiation conductor 11 of each antenna unit 60 generally emits electromagnetic waves having an intensity distribution $F_{+z}$ having maximum intensity in the direction perpendicular to planar radiation conductor 11, that is, in the positive direction of the z-axis. Though not shown, when signal power is selectively fed to planar antenna 52 through first strip conductor 21 and second strip conductor 22, planar radiation conductor 11 of each antenna unit 60 emits electromagnetic waves that have maximum intensity in the positive direction of the z-axis and extends over the xz plane or the yz plane. When signal power is supplied to linear antenna 55 of each antenna unit 60 as shown in FIG. 10B, linear radiation conductors 25 and 26 generally emit electromagnetic waves having an intensity distribution $F_{-x}$ that has maximum intensity in the negative direction of the y-axis and extends over the yz plane.

In multi-axis array antenna 106, planar antenna 52 and linear antenna 55 may simultaneously or selectively be used. When lowering in gain due to interference resulting from simultaneous power feed to these antennas is not preferred, for example, when signal power in phase is supplied to planar antenna 52 and linear antenna 55, an RF switch may be used to selectively provide a signal to be transmitted or received to planar antenna 52 or linear antenna 55.

When planar antenna 52 and linear antenna 55 are simultaneously used, a phase difference is preferably provided to signals provided to planar antenna 52 and linear antenna 55. Interference can thus be suppressed and gain can be improved. For example, a signal to be transmitted or received should only selectively be provided to planar antenna 52 or linear antenna 55 by using a phase shifter constituted of a diode switch or a MEMS switch.

Multi-axis antenna 106 includes a plurality of antenna units 60. Therefore, beam forming of electromagnetic waves radiated from planar antenna 52 and linear antenna 55 can also be carried out.

Fourth Embodiment

Figure 11:
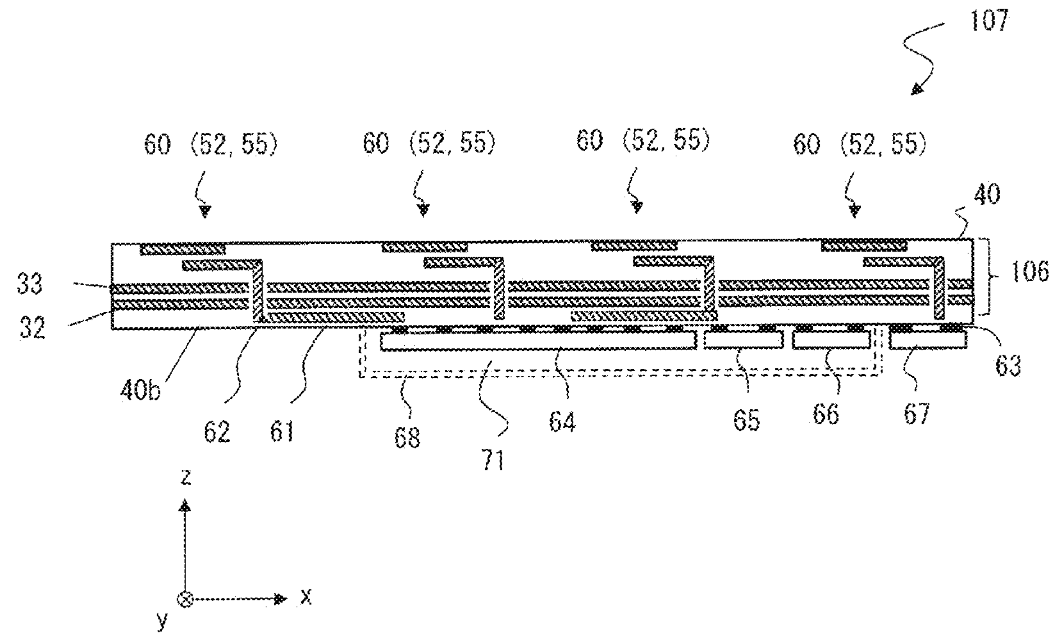
FIG. 11 is a schematic cross-sectional view showing an embodiment of a wireless communication module.

An embodiment of a wireless communication module in the present disclosure will be described. FIG. 11 is a schematic cross-sectional view in the xz plane, of a wireless communication module 107. Wireless communication module 107 includes, for example, multi-axis array antenna 106 in the third embodiment, active elements 64 and 65, a passive element 66, and a connector 67. Wireless communication module 107 is also called an Antenna in Package. Wireless communication module 107 may include a cover 68 that covers active elements 64 and 65 and passive element 66. Cover 68 is composed of a metal or the like and performs a function as an electromagnetic shield or a heat sink or both of them. When the function for electromagnetic shielding and/or heat radiation is not required, active elements 64 and 65 and passive element 66 may be molded with a sealing resin 71 instead of cover 68. Alternatively, active elements 64 and 65 and passive element 66 may be molded with sealing resin 71, and an outer side of sealing resin 71 may be covered with cover 68. Connector 67 may be a surface mount type high-frequency coaxial connector or a low-frequency multipolar connector.

A conductor 61 and a via conductor 62 that form a wiring circuit pattern for connection to planar antenna 52 and linear antenna 55 are provided on a main surface 40*b* side of dielectric 40 relative to common ground conductor 32 in multi-axis array antenna 106. An electrode 63 is provided on main surface 40*b*. In an xz cross-section shown in FIG. 11, a constituent element of linear antenna 55 is not shown.

Active elements 64 and 65 are a DC/DC converter, a low noise amplifier (LNA), a power amplifier (PA), a high-frequency IC, and the like, and passive element 66 is a capacitor, a coil, an RF switch, and the like. Connector 67 is a connector for connection of wireless communication module 107 to the outside.

Active elements 64 and 65, passive element 66, and connector 67 are mounted on main surface 40*b* of multi-axis array antenna 106 by being connected to electrode 63 on main surface 40*b* of dielectric 40 of multi-axis array antenna 106 by solder or the like. A wiring circuit constituted of conductor 61 and via conductor 62, active elements 64 and 65, passive element 66, and connector 67 constitute a signal processing circuit or the like.

In wireless communication module 107, main surface 40*a* to which planar antenna 52 and linear antenna 55 are proximate is located opposite to main surface 40*b* to which active elements 64 and 65 are connected. Therefore, electromagnetic waves can be radiated from planar antenna 52 and linear antenna 55 without being affected by active elements 64 and 65, and radio waves in a band of submillimeter waves and millimeter waves from the outside can be received at planar antenna 52 and linear antenna 55. Therefore, a compact wireless communication module including an antenna capable of selective transmission and reception of electromagnetic waves in two directions orthogonal to each other can be realized.

Figure 12:
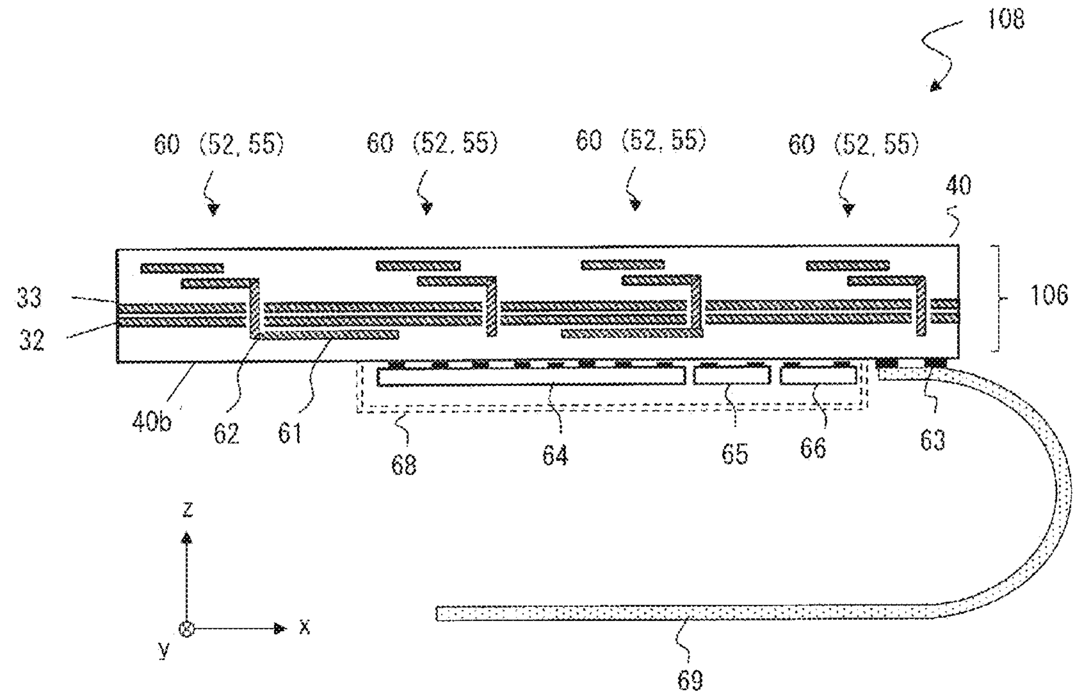
FIG. 12 is a schematic cross-sectional view showing another embodiment of a wireless communication module.

In a wireless communication module 108 shown in FIG. 12, electrode 63 of multi-axis array antenna 106 is electrically connected to a flexible line 69. Flexible line 69 is, for example, a flexible printed board on which a wiring circuit is formed, a coaxial cable, or a liquid crystal polymer substrate. In particular, the liquid crystal polymer is excellent in high-frequency characteristics, and hence it can suitably be used as a wiring circuit to multi-axis array antenna 106.

Fifth Embodiment

Figure 13A:
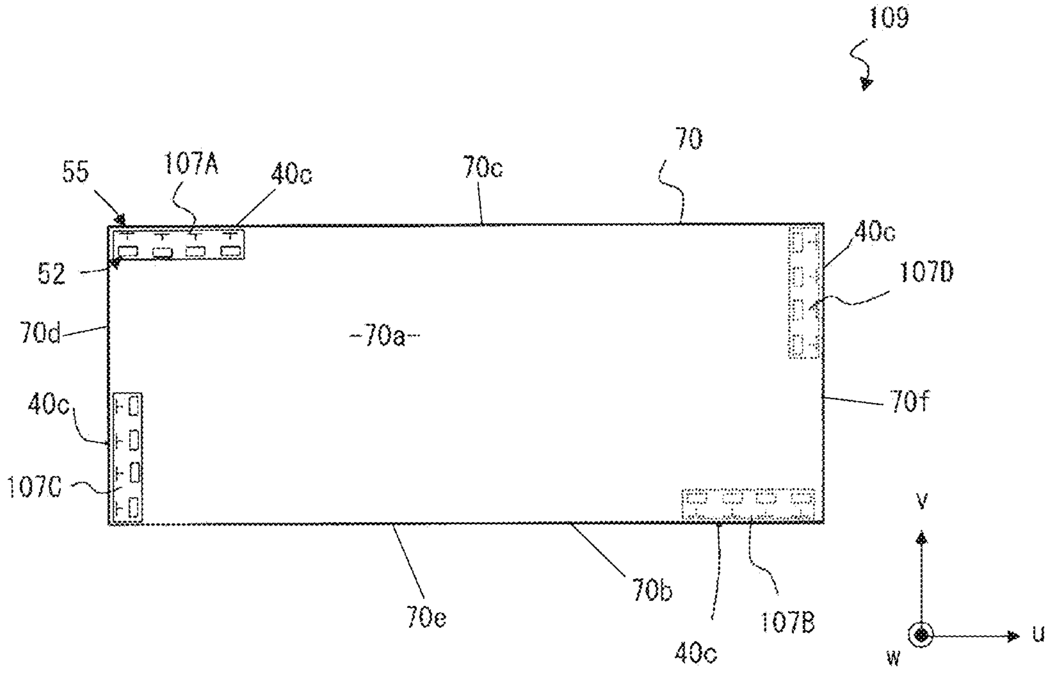
FIG. 13A is a schematic plan view of one embodiment of a wireless communication device.
Figure 13B:
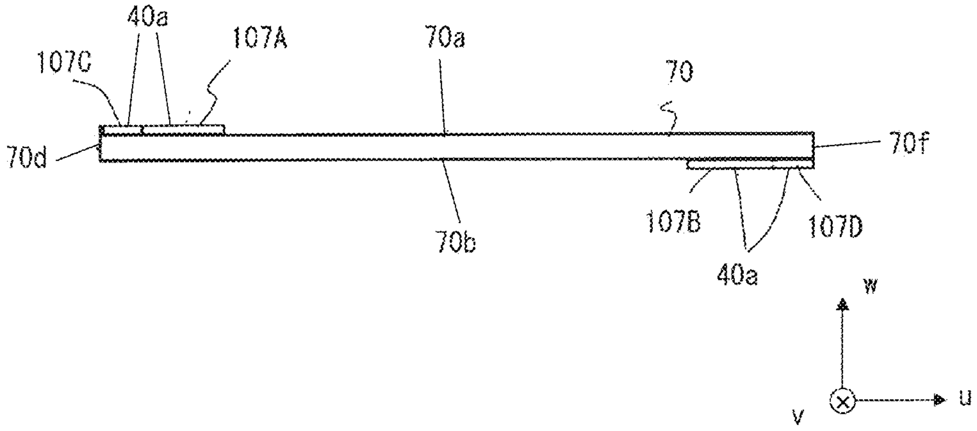
FIG. 13B is a schematic side view of one embodiment of the wireless communication device.

An embodiment of a wireless communication device in the present disclosure will be described. FIG. 13A is a schematic plan view of a wireless communication device 109, and FIG. 13B is a schematic side view thereof. Wireless communication device 109 includes a main board (circuit board) 70 and one or more wireless communication modules 107. In FIGS. 13A and 13B, wireless communication device 109 includes four wireless communication modules 107A to 107D.

Main board 70 is provided with an electronic circuit and a wireless communication circuit necessary for performing a function of wireless communication device 109. In order to detect an attitude and a position of main board 70, a geomagnetic sensor or a GPS unit may be provided.

Main board 70 includes main surfaces 70*a* and 70*b* and four side portions 70*c*, 70*d*, 70*e*, and 70*f* Main surfaces 70*a* and 70*b* are perpendicular to a w-axis in the second right rectangular coordinate system. Side portions 70*c* and 70*e* are perpendicular to a v-axis, and side portions 70*d* and 70*f* are perpendicular to a u-axis. Though FIG. 13A schematically shows main board 70 in a shape of a parallelepiped including a quadrangular main surface, each of side portions 70*c*, 70*d*, 70*e*, and 70*f* may be formed from a plurality of surfaces.

Wireless communication device 109 includes one or more wireless communication modules. The number of wireless communication modules can be adjusted depending on the specifications of the wireless communication device such as in which direction electromagnetic waves are transmitted and received and how high sensitivity in transmission and reception should be, and the required performance. A position of the wireless communication module on main board 70 can also be set to an arbitrary position in consideration of electromagnetic interference with other wireless communication modules or other functional modules in the wireless communication device, interference in terms of arrangement, and sensitivity in transmission and reception of electromagnetic waves with an exterior of the wireless communication device being interposed. When the wireless communication module is arranged on main surfaces 70*a* and 70*b* of main board 70, interference with another circuit provided on main board 70 may be less likely at a position proximate to one of side portions 70*c*, 70*d*, 70*e*, and 70*f* Arrangement of the wireless communication module on main surfaces 70*a* and 70*b* is not limited to arrangement at positions in proximity to side portions 70*c*, 70*d*, 70*e*, and 70*f*, and the wireless communication module may be arranged in the center of main surfaces 70*a* and 70*b*.

In the present embodiment, in wireless communication device 109, wireless communication modules 107A to 107D are arranged on main surface 70*a* or main surface 70*b* such that side surface 40*c* of dielectric 40 of multi-axis array antenna 106 is proximate to one of side portions 70*c*, 70*d*, 70*e*, and 70*f* and main surface 40*a* of dielectric 40 is located opposite to main board 70. Linear radiation conductors 25 and 26 of linear antenna 55 are proximate to side surface 40*c* of dielectric 40, and electromagnetic waves are radiated from side surface 40*c*. Planar radiation conductor 11 of planar antenna 52 is proximate to main surface 40*a* of dielectric 40, and electromagnetic waves are radiated from main surface 40*a*. Therefore, wireless communication modules 107A to 107D are arranged on main board 70 at positions and in directions where electromagnetic waves radiated from wireless communication modules 107A to 107D are less likely to interfere with main board 70. Wireless communication modules 107A to 107D may be proximate or distant in u, v, and w directions.

For example, in an example shown in FIG. 13A, wireless communication modules 107A and 107C are arranged on main surface 70*a* such that side surfaces 40*c* of wireless communication modules 107A and 107C are proximate to any of side portions 70*c* and 70*d*. Wireless communication modules 107B and 107D are arranged on main surface 70*b* such that side surfaces 40*c* of wireless communication modules 107B and 107D are proximate to any of side portions 70*e* and 70*f*. In the present embodiment, side surface 40*c* of wireless communication module 107A is proximate to side portion 70*c*, and side surface 40*c* of wireless communication module 107B is proximate to side portion 70*e*. Side surface 40*c* of wireless communication module 107C is proximate to side portion 70*d*, and side surface 40*c* of wireless communication module 107D is proximate to side portion 70*f* Wireless communication modules 107A to 107D are arranged in point symmetry with respect to the center of main board 70.

A direction of maximum intensity in a distribution of electromagnetic waves radiated from planar antenna 52 and linear antenna 55 of thus arranged wireless communication modules 107A to 107D is as shown in Table 1.

TABLE 1

| Wireless Communication Module | Direction of Radiation of Planar Antenna 52 | Direction of Radiation of Linear Antenna 55 |
|---|---|---|
| 107A | +w | +v |
| 107B | −w | −v |
| 107C | +w | −u |
| 107D | −w | +u |

Electromagnetic waves can thus be radiated in all directions (±u, ±v, and ±w directions) with respect to main board 70. For example, by position detection with the GPS unit of wireless communication device 109, the closest base station among a plurality of base stations around wireless communication device 109, position information of which has already been known, and a direction from wireless communication device 109 of that base station can be determined. By using a geomagnetic sensor of wireless communication device 109, an attitude of wireless communication device 109 can be determined, and wireless communication modules 107A to 107D and planar antenna 52/linear antenna 55 capable of radiating electromagnetic waves at highest intensity in that attitude to the determined base station with which they should communicate can be determined. Therefore, high-quality communication can be established by transmission and reception of electromagnetic waves by the determined wireless communication module and antenna.

Figure 14A:
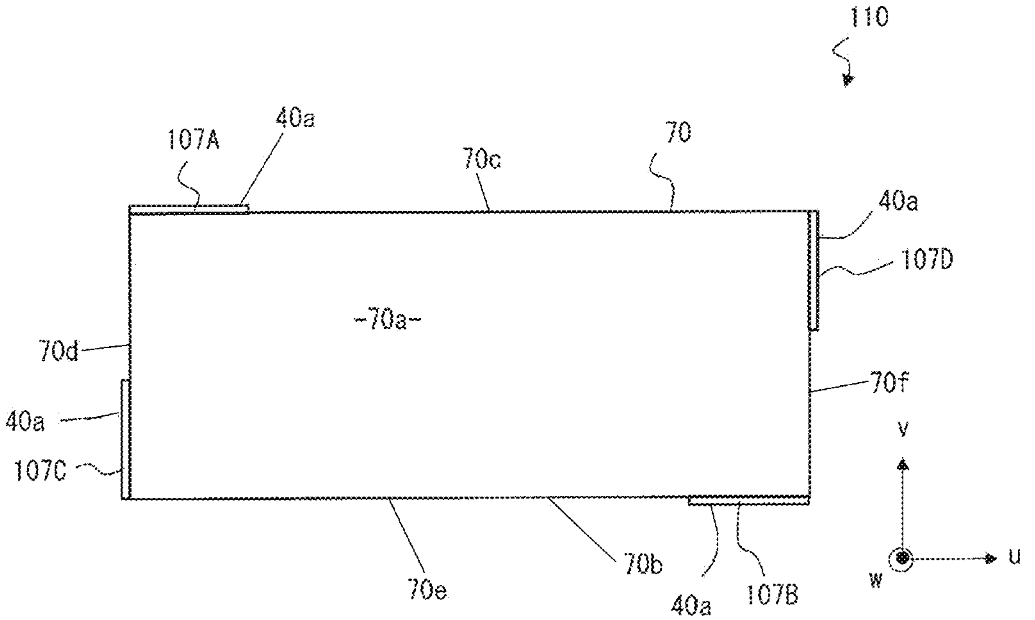
FIG. 14A is a schematic plan view of another form of a wireless communication device.
Figure 14B:
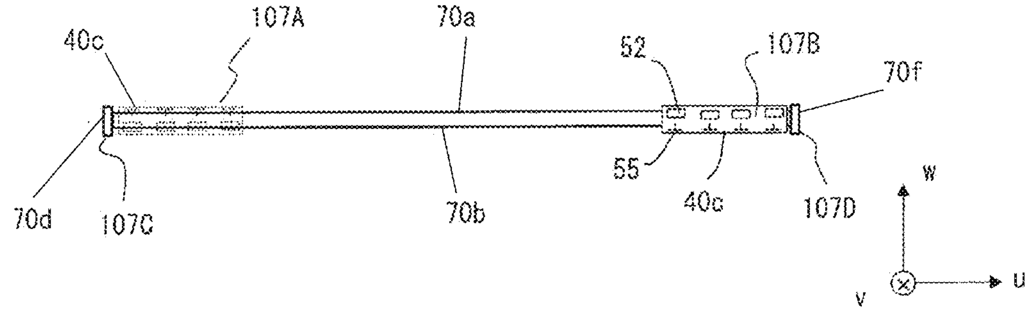
FIG. 14B is a schematic side view of another form of the wireless communication device.
Figure 14C:
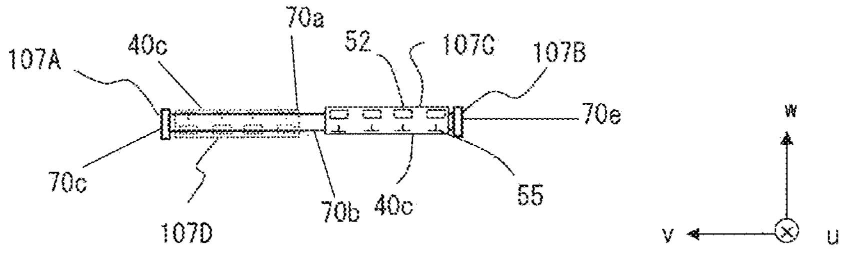
FIG. 14C is a schematic side view of another form of the wireless communication device.

Wireless communication modules 107A to 107D may be arranged on the side portion of main board 70. FIG. 14A is a schematic plan view of a wireless communication device 110, and FIGS. 14B and 14C are schematic side views thereof. In wireless communication device 110, wireless communication modules 107A to 107D are arranged on any of side portions 70*c* to 70*f* such that side surface 40*c* of dielectric 40 of multi-axis array antenna 106 is proximate to main surface 70*a* or 70*b* and main surface 40*a* of dielectric 40 is located opposite to main board 70.

In an example shown in FIGS. 14B and 14C, wireless communication modules 107A and 107B are arranged on side portions 70*c* and 70*e*, respectively, such that side surfaces 40*c* of wireless communication modules 107A and 107B are proximate to any of main surfaces 70*a* and 70*b*. Wireless communication modules 107C and 107D are arranged on side portions 70*d* and 70*f*, respectively, such that side surfaces 40*c* of wireless communication modules 107C and 107D are proximate to any of main surfaces 70*a* and 70*b*. In the present embodiment, side surface 40*c* of wireless communication module 107A is proximate to main surface 70*a*, and side surface 40*c* of wireless communication module 107B is proximate to main surface 70*b*. Side surface 40*c* of wireless communication module 107C is proximate to main surface 70*b*, and side surface 40*c* of wireless communication module 107D is proximate to main surface 70*a*. Wireless communication modules 107A to 107D are arranged in point symmetry with respect to the center of main board 70. Positions of wireless communication modules 107A to 107D in the w-axis direction may be displaced from the center of main board 70 in the w-axis direction. Wireless communication modules 107A to 107D may be in contact with or at a distance from side portions 70*c* to 70*f* of main board 70.

A direction of maximum intensity in a distribution of electromagnetic waves radiated from planar antenna 52 and linear antenna 55 of thus arranged wireless communication modules 107A to 107D is as shown in Table 2.

TABLE 2

| Wireless Communication Module | Direction of Radiation of Planar Antenna 52 | Direction of Radiation of Linear Antenna 55 |
|---|---|---|
| 107A | +v | +w |
| 107B | −v | −w |
| 107C | −u | −w |
| 107D | +u | +w |

Thus, also in arrangement shown in FIGS. 14A to 14C, electromagnetic waves can be radiated in all directions (±u, ±v, and ±w directions) with respect to main board 70.

Arrangement of wireless communication module 107 in the wireless communication device is not limited to that in the embodiments, and can further variously be modified. For example, at least one of a plurality of wireless modules may be arranged on at least one of main surfaces 70*a* and 70*b* of main board 70 and a remaining wireless module may be arranged on at least one of side portions 70*c*, 70*d*, 70*e*, and 70*f*

(Other Forms)

Features of the planar array antenna and the like described in the first to fifth embodiments can be combined as appropriate. For example, the feature that the width of the common ground conductor in the y-axis direction is less than the maximum width of the antenna ground conductor in the y-axis direction can be combined with any other embodiment of the first to fifth embodiments. The number of planar antennas in the planar array antenna is not limited to the number shown in the embodiments either. The planar array antenna may two-dimensionally be arranged, for example, in the x-axis direction and the y-axis direction. A shape of the planar radiation conductor is not limited to the illustrated shape either.

The planar antenna, the planar array antenna, the multi-axis array antenna, the wireless communication module, and the wireless communication device in the present disclosure can suitably be used in various antennas for high-frequency wireless communication and a wireless communication circuit including the antenna, and particularly suitably be used for a wireless communication device adapted to a band of quasi-microwaves, centimeter waves, submillimeter waves, and millimeter waves.

11 planar radiation conductor
12 to 15 passive conductor
12*d* to 15*d* side
21 first strip conductor
22 second strip conductor
23 via conductor
25, 26 linear radiation conductor
27, 28 feed conductor
31, 33 antenna ground conductor
31*c*, 32*c* hole
32 common ground conductor
33*a* to 33*h* side
40 dielectric
40*a*, 40*b* main surface
40*c* to 40*f* side surface
40*h* portion of dielectric 40
41 first via conductor
42 second via conductor
43 third via conductor
50, 50', 52, 52' planar antenna
55 linear antenna
60 antenna unit
61 conductor
62 via conductor
63 electrode
64, 65 active element
66 passive element
67 connector
68 cover
69 flexible line
70 main board
70*a*, 70*b* main surface
70*c* to 70*f* side portion
71 sealing resin
101 to 105 planar array antenna
106 multi-axis array antenna
107, 107A to 107D, 108 wireless communication module
109, 110 wireless communication device

The invention claimed is:

1. A planar antenna comprising:
a planar radiation conductor;
a common ground conductor;
a first strip conductor located between the planar radiation conductor and the common ground conductor and extending in a direction in parallel to a first axis in a first right rectangular coordinate system including first, second, and third axes;
a second strip conductor located between the planar radiation conductor and the common ground conductor and extending in a direction orthogonal to a direction of extension of the first strip conductor; and
at least one pair of passive conductors each including a side at an angle of 45±3° or −45±3° with respect to the first axis and opposed to the planar radiation conductor.

2. The planar antenna according to claim 1, wherein
the at least one pair of passive conductors includes:
one pair of passive conductors each including the side at the angle of 45±3° with respect to the first axis and opposed to the planar radiation conductor; and
another pair of passive conductors each including the side at the angle of −45±3° with respect to the first axis and opposed to the planar radiation conductor.

3. The planar antenna according to claim 1, wherein
the planar radiation conductor and the passive conductors are flush with each other.

4. The planar antenna according to claim 1, further comprising an antenna ground conductor located between the first and second strip conductors and the common ground conductor, wherein
the antenna ground conductor is superimposed at least on an entire portion of the planar radiation conductor when viewed in a direction of the third axis.

5. The planar antenna according to claim 4, further comprising at least one first via conductor connecting the passive conductor and the antenna ground conductor to each other.

6. The planar antenna according to claim 5, further comprising a dielectric including a main surface perpendicular to the direction of the third axis, wherein
the planar radiation conductor, the common ground conductor, the first strip conductor, the second strip conductor, and the passive conductors are located in the dielectric.

7. A planar array antenna comprising:
a plurality of planar antennas each including the planar antenna according to claim 5 and aligned in a direction of the first axis, wherein
dielectrics of the planar antennas are integrally provided,
common ground conductors of the planar antennas are connected to each other, and
antenna ground conductors of the planar antennas are separate from each other.

8. The planar array antenna according to claim 7, further comprising a plurality of second via conductors extending along the third axis and aligned in parallel to the second axis in at least one pair of adjacent planar antennas of the plurality of planar antennas, wherein
the plurality of second via conductors are connected to the common ground conductors.

9. The planar array antenna according to claim 8, wherein
the plurality of second via conductors include a first group further connected to the antenna ground conductor of one of the pair of adjacent planar antennas and a second group further connected to the antenna ground conductor of the other of the pair of adjacent planar antennas.

10. The planar array antenna according to claim 9, wherein each of the plurality of second via conductors has a height equal to or more than a distance between the common ground conductor and the planar radiation conductor in a direction in parallel to the third axis.

11. A planar antenna comprising:

a planar radiation conductor;

a common ground conductor;

a first strip conductor located between the planar radiation conductor and the common ground conductor and extending in a direction at an angle of 45±3° with respect to a first axis in a first right rectangular coordinate system including first, second, and third axes;

a second strip conductor located between the planar radiation conductor and the common ground conductor and extending in a direction orthogonal to a direction of extension of the first strip conductor; and an antenna ground conductor including in an outer periphery, at least one pair of sides located between the first and second strip conductors and the common ground conductor and being at an angle of 45±3° or −45±3° with respect to the first axis.

12. The planar antenna according to claim 11, wherein the antenna ground conductor includes, when viewed in a direction of the third axis, one pair of sides at the angle of 45±3° with respect to the first axis, between which the planar radiation conductor lies, and another pair of sides at the angle of −45±3° with respect to the first axis, between which the planar radiation conductor lies.

13. The planar antenna according to claim 11, further comprising at least one third via conductor located along the outer periphery of the antenna ground conductor and connecting the antenna ground conductor and the common ground conductor to each other.

14. The planar antenna according to claim 11, wherein a width of the common ground conductor in a direction in parallel to the second axis is less than a maximum width of the antenna ground conductor in parallel to the second axis.

15. The planar antenna according to claim 11, further comprising a dielectric including a main surface perpendicular to a direction of the third axis, wherein the planar radiation conductor, the common ground conductor, the first strip conductor, the second strip conductor, and the antenna ground conductor are located in the dielectric.

16. A planar array antenna comprising:

a plurality of planar antennas each including the planar antenna according to claim 15 and aligned in a direction of the first axis, wherein dielectrics of the planar antennas are integrally provided, common ground conductors of the planar antennas are connected to each other, and antenna ground conductors of the planar antennas are connected to each other.

17. The planar array antenna according to claim 16, comprising a plurality of second via conductors extending along the third axis and aligned in parallel to the second axis in at least one pair of adjacent planar antennas of the plurality of planar antennas, wherein the plurality of second via conductors are connected to the common ground conductors.

18. A multi-axis array antenna comprising:

the planar array antenna according to claim 7; and a plurality of linear antennas, wherein each of the linear antennas includes one linear radiation conductor or two linear radiation conductors, the linear radiation conductor being located at a distance from one of the plurality of planar antennas in a direction of the second axis and extending in parallel to the first axis.

19. The multi-axis array antenna according to claim 18, wherein the dielectric includes a side surface adjacent to a main surface and perpendicular to the second axis, and the one linear radiation conductor or the two linear radiation conductors of the linear antenna is/are arranged in the dielectric in proximity to the side surface.

20. A wireless communication module comprising:

the multi-axis array antenna according to claim 19; and at least one selected from the group consisting of an active component and a passive component.

* * * * *